US011979888B2

United States Patent
Li et al.

(10) Patent No.: US 11,979,888 B2
(45) Date of Patent: May 7, 2024

(54) MANAGING CO-CHANNEL OPERATIONS FOR MULTIPLE RADIO ACCESS TECHNOLOGIES

(71) Applicant: QUALCOMM Incorporated, San Diego, CA (US)

(72) Inventors: Qing Li, Princeton Junction, NJ (US); Tien Viet Nguyen, Bridgewater, NJ (US); Sourjya Dutta, San Diego, CA (US); Hong Cheng, Basking Ridge, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/392,106

(22) Filed: Aug. 2, 2021

(65) Prior Publication Data
US 2023/0032608 A1    Feb. 2, 2023

(51) Int. Cl.
*H04W 72/23*    (2023.01)
*H04W 72/02*    (2009.01)
(Continued)

(52) U.S. Cl.
CPC ........... *H04W 72/23* (2023.01); *H04W 72/02* (2013.01); *H04W 72/0453* (2013.01); *H04W 72/1263* (2013.01); *H04W 72/52* (2023.01)

(58) Field of Classification Search
CPC . H04W 72/23; H04W 72/02; H04W 72/0453; H04W 72/1263; H04W 72/52
See application file for complete search history.

(56) References Cited

U.S. PATENT DOCUMENTS

| 2020/0029318 A1* | 1/2020 | Guo ..................... H04L 5/0055 |
| 2020/0107236 A1 | 4/2020 | Tseng et al. |

(Continued)

FOREIGN PATENT DOCUMENTS

| WO | WO-2020199908 A1 | 10/2020 | |
| WO | WO-2021036834 A1 * | 3/2021 | ........... H04L 5/0053 |
| WO | WO-2021099359 A1 | 5/2021 | |

OTHER PUBLICATIONS

WO-2021036834-A1 (English translation) (Year: 2021).*
International Search Report and Written Opinion—PCT/US2022/037446—ISA/EPO—dated Nov. 29, 2022.

*Primary Examiner* — Yu-Wen Chang
(74) *Attorney, Agent, or Firm* — Holland & Hart LLP

(57) ABSTRACT

Methods, systems, and devices for wireless communication are described. A user equipment (UE) may receive control signaling indicating a co-channel configuration. The co-channel configuration may indicate a set of sidelink parameters for a co-channel operation associated with dynamically utilizing sidelink radio frequency resources allocated for a first radio access technology and sidelink radio frequency resources allocated for a second radio access technology. The UE may transmit, based on the received co-channel configuration, an indication of a set of channel availability parameter values indicating an amount of available sidelink radio frequency resources associated with the first radio access technology, the second radio access technology, or both. Subsequently, the UE may receive a grant scheduling a set of sidelink resources for the wireless communication associated with the second radio access technology based on the transmitted indication of the set of channel availability parameter values for the co-channel operation.

30 Claims, 18 Drawing Sheets

(51) Int. Cl.
    *H04W 72/0453*    (2023.01)
    *H04W 72/1263*    (2023.01)
    *H04W 72/52*    (2023.01)

(56) References Cited

U.S. PATENT DOCUMENTS

| | | |
|---|---|---|
| 2020/0145867 A1* | 5/2020 | Tseng .................... H04W 24/10 |
| 2020/0229114 A1* | 7/2020 | Ryu .................... H04L 27/2613 |
| 2020/0314928 A1* | 10/2020 | Kang .................... H04W 76/14 |
| 2021/0006954 A1* | 1/2021 | Xu ........................ H04W 8/04 |
| 2021/0022142 A1* | 1/2021 | Wu ....................... H04W 72/23 |
| 2021/0045074 A1* | 2/2021 | Manolakos ........... H04L 5/0057 |
| 2021/0058915 A1* | 2/2021 | Lu ......................... H04W 72/20 |
| 2021/0120528 A1* | 4/2021 | Peng ..................... H04W 4/44 |
| 2021/0195560 A1 | 6/2021 | Ryu et al. |
| 2021/0204100 A1* | 7/2021 | Lin ...................... H04L 1/0003 |
| 2021/0204252 A1* | 7/2021 | Akkarakaran ........ H04W 72/02 |
| 2021/0306885 A1* | 9/2021 | Hou .................... H04W 52/346 |
| 2021/0345300 A1* | 11/2021 | Selvanesan ............. H04L 5/001 |
| 2021/0377884 A1* | 12/2021 | Lee ....................... H04W 24/08 |
| 2022/0070826 A1* | 3/2022 | Xu ........................ H04W 72/20 |
| 2022/0174774 A1* | 6/2022 | Tseng .................... H04W 76/34 |
| 2022/0248375 A1* | 8/2022 | Baek ................ H04W 28/0236 |
| 2022/0286876 A1* | 9/2022 | Van Phan ............. H04W 24/10 |
| 2022/0312386 A1* | 9/2022 | Sun ........................ H04B 1/713 |
| 2022/0330278 A1* | 10/2022 | Hong .................... H04W 92/18 |
| 2022/0400469 A1* | 12/2022 | Li ..................... H04W 74/0808 |

\* cited by examiner

MANAGING CO-CHANNEL OPERATIONS FOR MULTIPLE RADIO ACCESS TECHNOLOGIES

FIELD OF TECHNOLOGY

The following relates to wireless communication, including managing co-channel operations for multiple radio access technologies.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support managing co-channel operations for multiple radio access technologies. A communication device may receive a co-channel configuration to enable co-channel operation between multiple radio access technologies, such as 4G LTE and 5G NR, among other examples. The co-channel configuration may include an indication of whether the co-channel operation (e.g., NR-LTE co-channel operation) is enabled or disabled by another communication device, such as a base station. In some examples, the co-channel configuration may include an indication of carriers supporting or not supporting the co-channel operation. The co-channel configuration may also include resource pools on the carriers supporting the co-channel operation. Additionally or alternatively, the co-channel configuration may indicate measurement and reporting for the co-channel operation. The communication device may report information to another communication device, such as a base station, which it may use to manage the co-channel operation (e.g., resource allocation) between the multiple radio access technologies at the communication device.

A method for wireless communication at a UE is described. The method may include receiving control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology, transmitting, based on the received co-channel configuration, an indication of a set of channel availability parameter values indicating an amount of available sidelink radio frequency resources associated with the first radio access technology, the second radio access technology, or both, and receiving a grant scheduling a set of sidelink resources for the wireless communication associated with the second radio access technology based on the transmitted indication of the set of channel availability parameter values for the co-channel operation.

An apparatus for wireless communication at a UE is described. The apparatus may include a processor, memory coupled with the processor, and instructions stored in the memory. The instructions may be executable by the processor to cause the apparatus to receive control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology, transmit, based on the received co-channel configuration, an indication of a set of channel availability parameter values indicating an amount of available sidelink radio frequency resources associated with the first radio access technology, the second radio access technology, or both, and receive a grant scheduling a set of sidelink resources for the wireless communication associated with the second radio access technology based on the transmitted indication of the set of channel availability parameter values for the co-channel operation.

Another apparatus for wireless communication at a UE is described. The apparatus may include means for receiving control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology, means for transmitting, based on the received co-channel configuration, an indication of a set of channel availability parameter values indicating an amount of available sidelink radio frequency resources associated with the first radio access technology, the second radio access technology, or both, and means for receiving a grant scheduling a set of sidelink resources for the wireless communication associated with the second radio access technology based on the transmitted indication of the set of channel availability parameter values for the co-channel operation.

A non-transitory computer-readable medium storing code for wireless communication at a UE is described. The code may include instructions executable by a processor to receive control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology, transmit, based on the received co-channel configuration, an indication of a set of channel availability parameter values indicating an amount of available sidelink radio frequency resources associated with the first radio access technology, the second radio access technology, or both, and receive a grant scheduling a set of sidelink resources for the wireless communication associated with the second radio access technology based on the transmitted indication of the set of channel availability parameter values for the co-channel operation.

Some examples of the method, apparatuses, and non-transitory computer-readable medium described herein may further include operations, features, means, or instructions for determining that the co-channel operation associated with the first radio access technology may be enabled or disabled based on at least one sidelink parameter of the set of sidelink parameters in the received control signaling and where the at least one sidelink parameter includes a bit field indicating that the co-channel operation may be enabled or disabled.

Some examples of the method, apparatuses, and non-transitory computer-readable medium described herein may further include operations, features, means, or instructions for determining a set of component carriers supporting the co-channel operation associated with the first radio access technology and the second radio access technology based on at least one sidelink parameter of the set of sidelink parameters in the received control signaling and where the set of component carriers includes one or more of a first subset of component carriers associated with the first radio access technology indicated as shareable or un-shareable with the second radio access technology.

Some examples of the method, apparatuses, and non-transitory computer-readable medium described herein may further include operations, features, means, or instructions for determining a set of sidelink resource pools based on the determined set of component carriers supporting the co-channel operation associated with the first radio access technology and the second radio access technology and where the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

In some examples of the method, apparatuses, and non-transitory computer-readable medium described herein, receiving the grant may include operations, features, means, or instructions for receiving a downlink control information (DCI) indicating one or more of the first subset of sidelink resource pools associated with the first radio access technology nonoverlapping with the second subset of sidelink resource pools associated with the second radio access technology, the third subset of sidelink resource pools associated with the first radio access technology overlapping with the fourth subset of sidelink resource pools associated with the second radio access technology, or the fourth subset of sidelink resource pools associated with the second radio access technology overlapping with the third subset of sidelink resource pools associated with the first radio access technology.

In some examples of the method, apparatuses, and non-transitory computer-readable medium described herein, receiving the control signaling may include operations, features, means, or instructions for receiving a radio resource control (RRC) message including the co-channel configuration indicating the set of sidelink parameters for the co-channel operation.

In some examples of the method, apparatuses, and non-transitory computer-readable medium described herein, receiving the control signaling may include operations, features, means, or instructions for receiving system information (SI) including the co-channel configuration indicating the set of sidelink parameters for the co-channel operation, the SI including a sidelink system information block (SIB).

Some examples of the method, apparatuses, and non-transitory computer-readable medium described herein may further include operations, features, means, or instructions for determining a sidelink reporting configuration for the set of channel availability parameter values based on at least one sidelink parameter of the set of sidelink parameters in the received control signaling, the at least one sidelink parameter corresponding to one or more of sidelink measurement or sidelink reporting and where transmitting the indication of the set of channel availability parameter values for the co-channel operation associated with one or more of the first radio access technology or the second radio access technology may be based on the determined sidelink reporting configuration.

Some examples of the method, apparatuses, and non-transitory computer-readable medium described herein may further include operations, features, means, or instructions for transmitting sidelink UE information indicating that the UE supports the co-channel operation associated with the first radio access technology and the second radio access technology, the sidelink UE information corresponding to sidelink UE capability or sidelink UE assistance information, the sidelink UE capability or the sidelink UE assistance information including one or more of the set of sidelink parameters and where receiving the control signaling indicating the co-channel configuration may be based on the transmitted sidelink UE information.

Some examples of the method, apparatuses, and non-transitory computer-readable medium described herein may further include operations, features, means, or instructions for determining a physical uplink shared channel (PUSCH) configured for reporting the set of channel availability parameter values for the co-channel operation, where transmitting the indication includes and transmitting a medium access control-control element (MAC-CE) using the PUSCH, the MAC-CE including the indication of the set of channel availability parameter values for the co-channel operation associated with the second radio access technology.

Some examples of the method, apparatuses, and non-transitory computer-readable medium described herein may further include operations, features, means, or instructions for determining a physical uplink control channel (PUCCH) configured for reporting the set of channel availability parameter values for the co-channel operation, where transmitting the indication includes and transmitting uplink control information (UCI) using the PUCCH, the UCI including the indication of the set of channel availability parameter values for the co-channel operation associated with the second radio access technology.

Some examples of the method, apparatuses, and non-transitory computer-readable medium described herein may further include operations, features, means, or instructions for aggregating one or more channel availability parameter values into the set of channel availability parameter values for the co-channel operation based on receiving the one or more channel availability parameter values from one or more additional UEs and where the indication indicates the aggregated one or more channel availability parameter values for the co-channel operation associated with the second radio access technology.

Some examples of the method, apparatuses, and non-transitory computer-readable medium described herein may further include operations, features, means, or instructions for determining a PUSCH configured for reporting the aggregated one or more channel availability parameter values for the co-channel operation associated with the second radio access technology, where transmitting the indication includes and transmitting a set of multiple MAC-CEs using a PUSCH, each MAC-CE of the set of multiple MAC-CEs indicating a respective channel availability parameter value of the aggregated one or more channel availability parameter values.

Some examples of the method, apparatuses, and non-transitory computer-readable medium described herein may further include operations, features, means, or instructions for determining a PUSCH configured for reporting the aggregated one or more channel availability parameter values for the co-channel operation associated with the second radio access technology, where transmitting the indication includes and transmitting a MAC-CE using a PUSCH, the MAC-CE including the indication of the aggregated one or more channel availability parameter values, the MAC-CE including a set of multiple MAC-CE fields, each MAC-CE field indicating a respective channel availability parameter value of the aggregated one or more channel availability parameter values.

Some examples of the method, apparatuses, and non-transitory computer-readable medium described herein may further include operations, features, means, or instructions for determining a quality of service (QoS) for wireless communication associated with the second radio access technology, the QoS indicating one or more of a latency metric or a priority metric associated with the wireless communication and where transmitting the indication of the set of channel availability parameter values for the co-channel operation associated with the first radio access technology and the second radio access technology may be based on determining the QoS for wireless communication associated with the second radio access technology.

Some examples of the method, apparatuses, and non-transitory computer-readable medium described herein may further include operations, features, means, or instructions for estimating at least one channel availability parameter value of the set of channel availability parameter values associated with the first radio access technology or the second radio access technology and where transmitting the indication of the set of channel availability parameter values for the co-channel operation associated with the first radio access technology and the second radio access technology may be based on estimating the at least one channel availability parameter value of the set of channel availability parameter values associated with the first radio access technology or the second radio access technology.

Some examples of the method, apparatuses, and non-transitory computer-readable medium described herein may further include operations, features, means, or instructions for determining a channel busy ratio (CBR) for a set of component carriers associated with one or more of the first radio access technology or the second radio access technology and where transmitting the indication of the set of channel availability parameter values for the co-channel operation associated with the first radio access technology and the second radio access technology may be based on determining the CBR for the set of component carriers associated with one or more of the first radio access technology or the second radio access technology.

Some examples of the method, apparatuses, and non-transitory computer-readable medium described herein may further include operations, features, means, or instructions for transmitting a scheduling request configured for the co-channel operation associated with the first radio access technology and the second radio access technology and where receiving the grant scheduling the wireless communication may be based on transmitting the scheduling request configured for the co-channel operation.

In some examples of the method, apparatuses, and non-transitory computer-readable medium described herein, at least one channel availability parameter value of the set of channel availability parameter values may be based on a traffic load or a number of UEs associated with one or more of the first radio access technology or the second radio access technology.

In some examples of the method, apparatuses, and non-transitory computer-readable medium described herein, receiving the grant may include operations, features, means, or instructions for receiving a dynamic grant via a DCI including a DCI field enabling the UE to report the set of channel availability parameter values for the co-channel operation associated with one or more of the first radio access technology or the second radio access technology and where transmitting the indication may be based on the received DCI.

Some examples of the method, apparatuses, and non-transitory computer-readable medium described herein may further include operations, features, means, or instructions for transmitting sidelink control information indicating unavailable sidelink resources associated with the first radio access technology based on receiving a DCI including a DCI field indicating a set of resources associated with one or more of the first radio access technology or the second radio access technology.

In some examples of the method, apparatuses, and non-transitory computer-readable medium described herein, receiving the grant may include operations, features, means, or instructions for receiving a configured grant via an RRC message, the configured grant indicting that the set of sidelink resources may be updated for the wireless communication associated with the second radio access technology, the set of sidelink resources corresponding to a set of resource associated with the first radio access technology.

In some examples of the method, apparatuses, and non-transitory computer-readable medium described herein, receiving the grant may include operations, features, means, or instructions for receiving a configured grant via a DCI activating the set of sidelink resources for the wireless communication associated with the second radio access technology, the set of sidelink resources corresponding to a set of resource associated with the first radio access technology.

In some examples of the method, apparatuses, and non-transitory computer-readable medium described herein, the first radio access technology includes 4G LTE and the second radio access technology includes 5G NR.

A method for wireless communication at a base station is described. The method may include transmitting control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology, receiving, based on the transmitted co-channel configuration, an indication of a set of channel availability parameter values indicating an amount of available sidelink radio frequency resources associated with the first radio access technology, the second radio access technology, or both, and transmitting a grant scheduling the wireless communication associated with the second radio access technology based on the received indication of the set of channel availability parameter values for the co-channel operation.

An apparatus for wireless communication at a base station is described. The apparatus may include a processor, memory coupled with the processor, and instructions stored in the memory. The instructions may be executable by the processor to cause the apparatus to transmit control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology, receive, based on the transmitted co-channel configuration, an indication of a set of channel availability parameter values indicating an amount of available sidelink radio frequency resources associated with the first radio access technology, the second radio access technology, or both, and transmit a grant scheduling the wireless communication associated with the second radio access technology based on the received indication of the set of channel availability parameter values for the co-channel operation.

Another apparatus for wireless communication at a base station is described. The apparatus may include means for transmitting control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology, means for receiving, based on the transmitted co-channel configuration, an indication of a set of channel availability parameter values indicating an amount of available sidelink radio frequency resources associated with the first radio access technology, the second radio access technology, or both, and means for transmitting a grant scheduling the wireless communication associated with the second radio access technology based on the received indication of the set of channel availability parameter values for the co-channel operation.

A non-transitory computer-readable medium storing code for wireless communication at a base station is described. The code may include instructions executable by a processor to transmit control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology, receive, based on the transmitted co-channel configuration, an indication of a set of channel availability parameter values indicating an amount of available sidelink radio frequency resources associated with the first radio access technology, the second radio access technology, or both, and transmit a grant scheduling the wireless communication associated with the second radio access technology based on the received indication of the set of channel availability parameter values for the co-channel operation.

In some examples of the method, apparatuses, and non-transitory computer-readable medium described herein, transmitting the control signaling may include operations, features, means, or instructions for transmitting an RRC message including the co-channel configuration indicating the set of sidelink parameters for the co-channel operation.

In some examples of the method, apparatuses, and non-transitory computer-readable medium described herein, transmitting the control signaling may include operations, features, means, or instructions for transmitting SI including the co-channel configuration indicating the set of sidelink parameters for the co-channel operation, the SI including a sidelink SIB.

In some examples of the method, apparatuses, and non-transitory computer-readable medium described herein, transmitting the grant may include operations, features, means, or instructions for transmitting a DCI indicating one or more of a first subset of sidelink resource pools associated with the first radio access technology nonoverlapping with a second subset of sidelink resource pools associated with the second radio access technology, a third subset of sidelink resource pools associated with the first radio access technology overlapping with a fourth subset of sidelink resource pools associated with the second radio access technology, or the fourth subset of sidelink resource pools associated with the second radio access technology overlapping with the third subset of sidelink resource pools associated with the first radio access technology.

DETAILED DESCRIPTION

Figure 1:
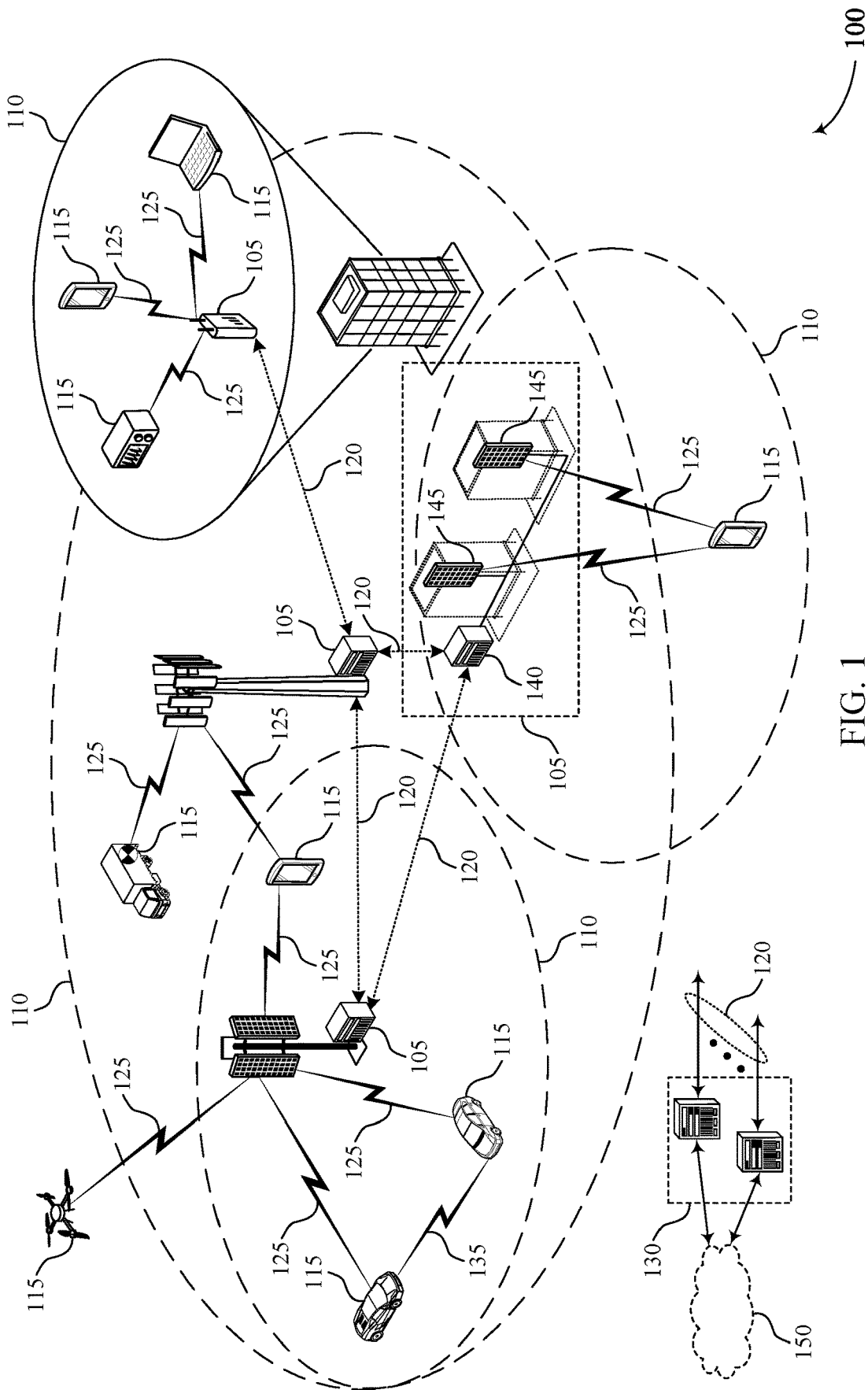
FIGS. 1 and 2 illustrate examples of wireless communications systems that support managing co-channel operations for multiple radio access technologies in accordance with aspects of the present disclosure.

A wireless communications system may include communication devices, such as a UE or a base station (for example, an eNodeB (eNB), a next-generation NodeB or a giga-NodeB, any of which may be referred to as a gNB, or some other base station), that may support multiple radio access technologies. Examples of radio access technologies include 4G systems, such as LTE systems, and 5G systems, which may be referred to as NR systems. In some cases, the UE may support various applications, such as vehicle-to-everything (V2X) applications that may result in wideband operations to meet low latency and high data rate requirements of the V2X applications. In some cases, radio frequency spectrum bands (e.g., resources) allocated for each radio access technology may be inadequate. For example, a limited radio frequency spectrum band may be allocated for NR V2X operations. It may be desirable to improve wideband operations for V2X applications when the UE supports multiple radio access technologies, such as 4G LTE and 5G NR. That is, it may be desirable to dynamically support system resource utilization on sidelink when the UE supports both NR V2X and LTE V2X operations.

Various aspects of present disclosure relate to enabling the UE to support dynamic co-channel operation between NR V2X and LTE V2X. In some examples, the co-channel operation between NR V2X and LTE V2X may be managed by the base station. As such, the UE may receive, from the base station, a co-channel configuration to enable the co-channel operation between NR V2X and LTE V2X. For example, the UE may receive the co-channel configuration in a radio resource control (RRC) message, a system information block (SIB), other system information (SI), a downlink control information (DCI), a medium access control-control element (MAC-CE), or other system control signal or message. The co-channel configuration may include an indication of whether the base station supports co-channel operation (e.g., NR-LTE co-channel operation). In some examples, the co-channel configuration may include an indication of carriers supporting or not supporting the co-channel operation. The co-channel configuration may also include resource pools on the carriers supporting the co-channel operation. Additionally or alternatively, the co-channel configuration may indicate measurement and reporting for the co-channel operation. The UE may report information to the base station, which it may use to manage the co-channel operation (e.g., resource allocation) between NR V2X and LTE V2X for the UE.

By enabling the communication devices (e.g., one or more of the base station or the UE) to support co-channel operations for multiple radio access technologies, the communication devices may reduce power consumption. In addition, by enabling the communication devices (e.g., one or more of the base station or the UE) to support co-channel operations for multiple radio access technologies, the communication devices may experience decreased latency and increase reliability for wireless communication, among other examples.

Aspects of the disclosure are initially described in the context of wireless communications systems. Aspects of the disclosure are further illustrated by and described with reference to apparatus diagrams, system diagrams, and flowcharts that relate to managing co-channel operations for multiple radio access technologies.

FIG. 1 illustrates an example of a wireless communications system 100 that supports managing co-channel operations for multiple radio access technologies in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA).

Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units (RSU), or with the network via one or more network nodes (e.g., base stations 105) using vehicle-to-network (V2N) communications, or with both.

In the wireless communications system 100, one or more of a base station 105 or a UE 115 may support dynamic co-channel operation between NR V2X and LTE V2X. In some examples, the co-channel operation between NR V2X and LTE V2X may be managed by the base station 105. As such, the UE 115 may receive, from the base station 105, a co-channel configuration to enable the co-channel operation between NR V2X and LTE V2X. For example, the UE 115 may receive the co-channel configuration in an RRC message, a SIB, other SI, or the co-channel configuration indicated or activated via a DCI, a MAC-CE, or other system control signal or message. The co-channel configuration may include an indication of whether the base station 105 supports co-channel operation (e.g., NR-LTE co-channel operation).

In some examples, the co-channel configuration may include an indication of carriers supporting or not supporting the co-channel operation. The co-channel configuration may also include resource pools on the carriers supporting the co-channel operation. Additionally or alternatively, the co-channel configuration may indicate measurement and reporting for the co-channel operation. The UE 115 may report information to the base station 105, which it may use to manage the co-channel operation (e.g., resource allocation) between NR V2X and LTE V2X for the UE 115. In some cases, the UE 115 may report information, such as a penetration rate (i.e., NR capability).

The base station 105 may determine (e.g., estimate) a UE penetration rate (e.g., a percentage of UEs 115 supporting LTE or NR) in the wireless communications system 100 based on an indication in MAC-CE or sidelink control information (SCI) (e.g., SCI2) (e.g., UE detection based on the indication of supporting the second radio access technology (e.g., supporting NR) provided in MAC-CE or SCI2) or based on measurement such as congestion-based measurement such as a sidelink reference signal received power (SL-RSRP) or a channel busy ratio (CBR). The base station 105 may adaptively adjust sharing resources (e.g., 4G LTE resources) for transmissions associated to the second radio access technology (e.g., NR transmissions) based on one or more of the SL-RSRP, the CBR, or the UE penetration rate received from other UEs 115 in a group or proximity in the wireless communications system 100, among other examples as described herein.

Figure 2:
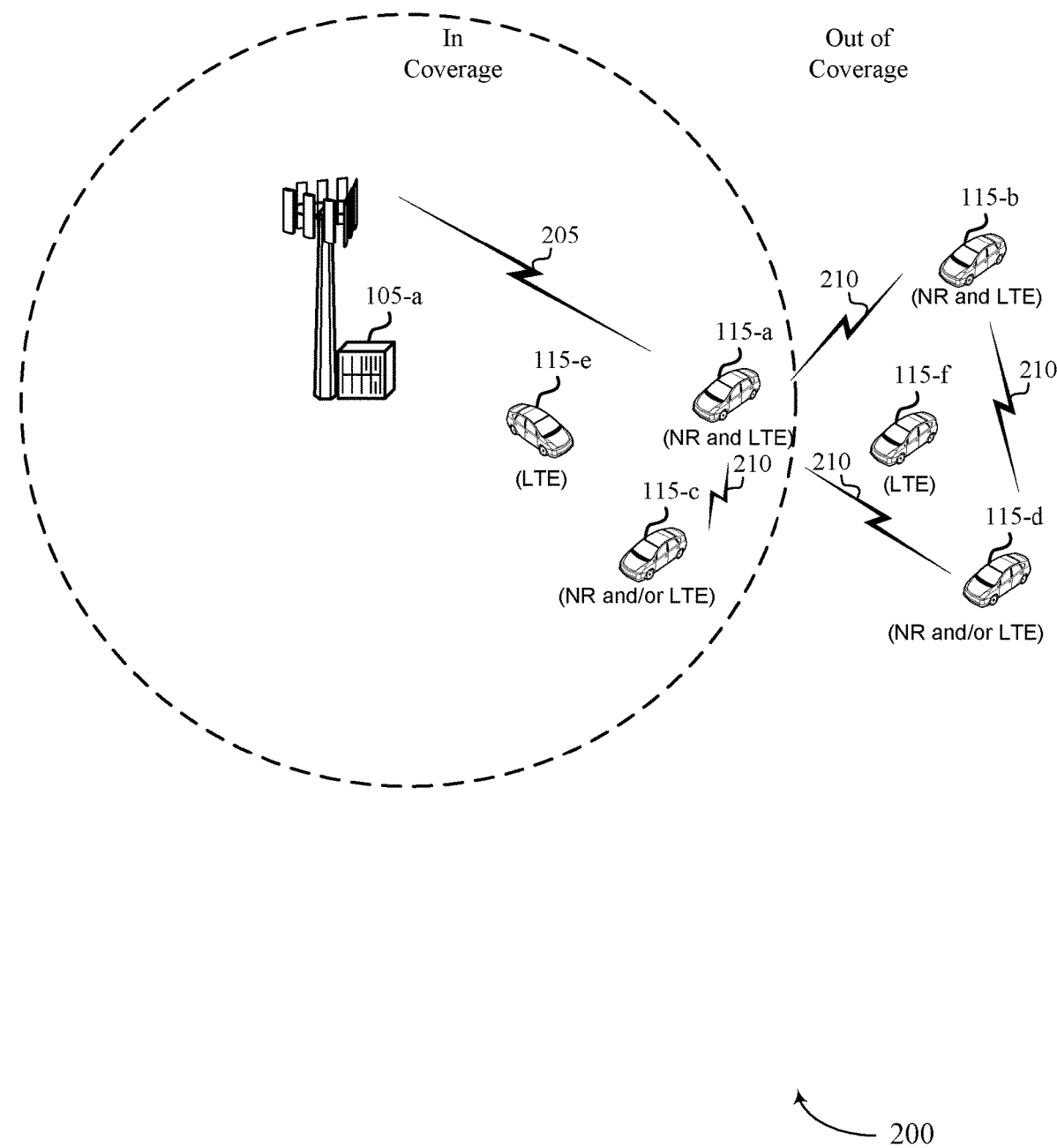

FIG. 2 illustrates an example of a wireless communications system 200 that supports managing co-channel operations for multiple radio access technologies in accordance with aspects of the present disclosure. The wireless communications system 200 may implement aspects of the wireless communications system 100 or may be implemented by aspects of the wireless communications system 100 as described with reference to FIG. 1. For example, the wireless communications system 200 may include a base station 105-a, a UE 115-a through a UE 115-f, which may be examples of corresponding devices as described with reference to FIG. 1. In the example of FIG. 2, the wireless communications system 200 may be a V2X system and one or more of the base station 105-a and the UE 115-a through the UE 115-f may supports V2X operations.

One or more of the base station 105-a and the UE 115-a through the UE 115-f may be configured with multiple antennas, which may be used to employ techniques such as transmit diversity, receive diversity, multiple-input multiple-output communications, or beamforming, or any combination thereof. The antennas of one or more of the base station 105-a and the UE 115-a through the UE 115-f may be located within one or more antenna arrays or antenna panels, which may support multiple-input multiple-output operations or transmit or receive beamforming. The base station 105-a may have an antenna array with a number of rows and columns of antenna ports that the base station 105-a may use to support beamforming of wireless communications with the UE 115-a through the UE 115-f. Likewise, one or more of the UE 115-a through the UE 115-f may have one or more antenna arrays that may support various multiple-input multiple-output or beamforming operations. Additionally or alternatively, an antenna panel may support radio frequency beamforming for a signal transmitted via one or more antenna ports.

The base station 105-a may perform wireless communication (e.g., transmit or receive control information or data) directly with one or more of the UE 115-a through the UE 115-f via an access link 205 (e.g., a Uu interface). Likewise, one or more of the UE 115-a through the UE 115-f may perform wireless communication (e.g., transmit or receive control information or data) directly with the base station via an access link 205 (e.g., a Uu interface). In the wireless communications system 200, a UE 115 (e.g., the UE 115-a through the UE 115-f) may perform wireless communication (e.g., transmit or receive sidelink control information or sidelink data) with another UE 115 in the wireless communications system 200 via a sidelink 210 (e.g., a PC5 interface). In some examples, the base station 105-a may perform wireless communication (e.g., transmit or receive control information or data) indirectly with one or more of the UE 115-a through the UE 115-f by communicating wireless communication to an intermediate UE 115 via an access link 205 (e.g., a Uu interface). The intermediate UE 115 may forward the wireless communication to a destination UE 115 via a sidelink 210.

In the example of FIG. 2, one or more of the UE 115-a through the UE 115-f may support one or more radio access technologies. For example, the UE 115-a and the UE 115-b may support both 4G LTE and 5G NR, the UE 115-c and the UE 115-d may support one or more of the 4G LTE and 5G NR, the UE 115-e and the UE 115-f may support only 4G LTE. The wireless communications system 200 may support dynamic efficient system resource utilization on sidelink 210 for a UE 115 supporting both 4G LTE and 5G NR (e.g., the UE 115-a in coverage and the UE 115-b out of coverage). To support the dynamic efficient system resource utilization, one or more of the UEs 115-a through UE 115-f may be enabled to determine when dynamic co-channel operation is allowed or not while in or out of coverage from the base station 105-a, and which carriers can or cannot be operated if such dynamic co-channel operation is allowed over NR and LTE resource pools, among other examples. Additionally, the wireless communications system 200 may enable the base station 105-a to manage the dynamic co-channel operation while mitigating or decreasing interference to LTE UEs and resource utilization for NR UEs. As such, for a UE 115 supporting both 5G NR and 4G LTE, the UE 115 may operate with either NR resources or LTE resources managed dynamically by the base station 105-a for improved resource utilization in the wireless communications system 200 as described herein.

For example, various aspects of present disclosure relate to enabling one or more of the UE 115-a through the UE 115-f to support dynamic co-channel operation between NR V2X and LTE V2X. In some examples, the co-channel operation between NR V2X and LTE V2X may be managed by the base station 105-a. As such, one or more of the UE 115-a through the UE 115-f may receive, from the base station 105-a, a co-channel configuration to enable the co-channel operation between NR V2X and LTE V2X. For example, one or more of the UE 115-a through the UE 115-f may receive the co-channel configuration in an RRC message, a SIB, an other SI, or the co-channel configuration indicated or activated via a DCI or a MAC-CE, or other system control signal or message. The co-channel configuration may include an indication of whether the base station supports co-channel operation (e.g., NR-LTE co-channel operation). In some examples, the co-channel configuration may include an indication of carriers supporting or not supporting the co-channel operation. The co-channel configuration may also include resource pools on the carriers supporting the co-channel operation. Additionally or alternatively, the co-channel configuration may indicate measurement and reporting for the co-channel operation. One or more of the UE 115-a through the UE 115-f may report information to the base station 105-a, which it may use to manage the co-channel operation (e.g., resource allocation) between NR V2X and LTE V2X for one or more of the UE 115-a through the UE 115-f as described herein.

Figure 3:
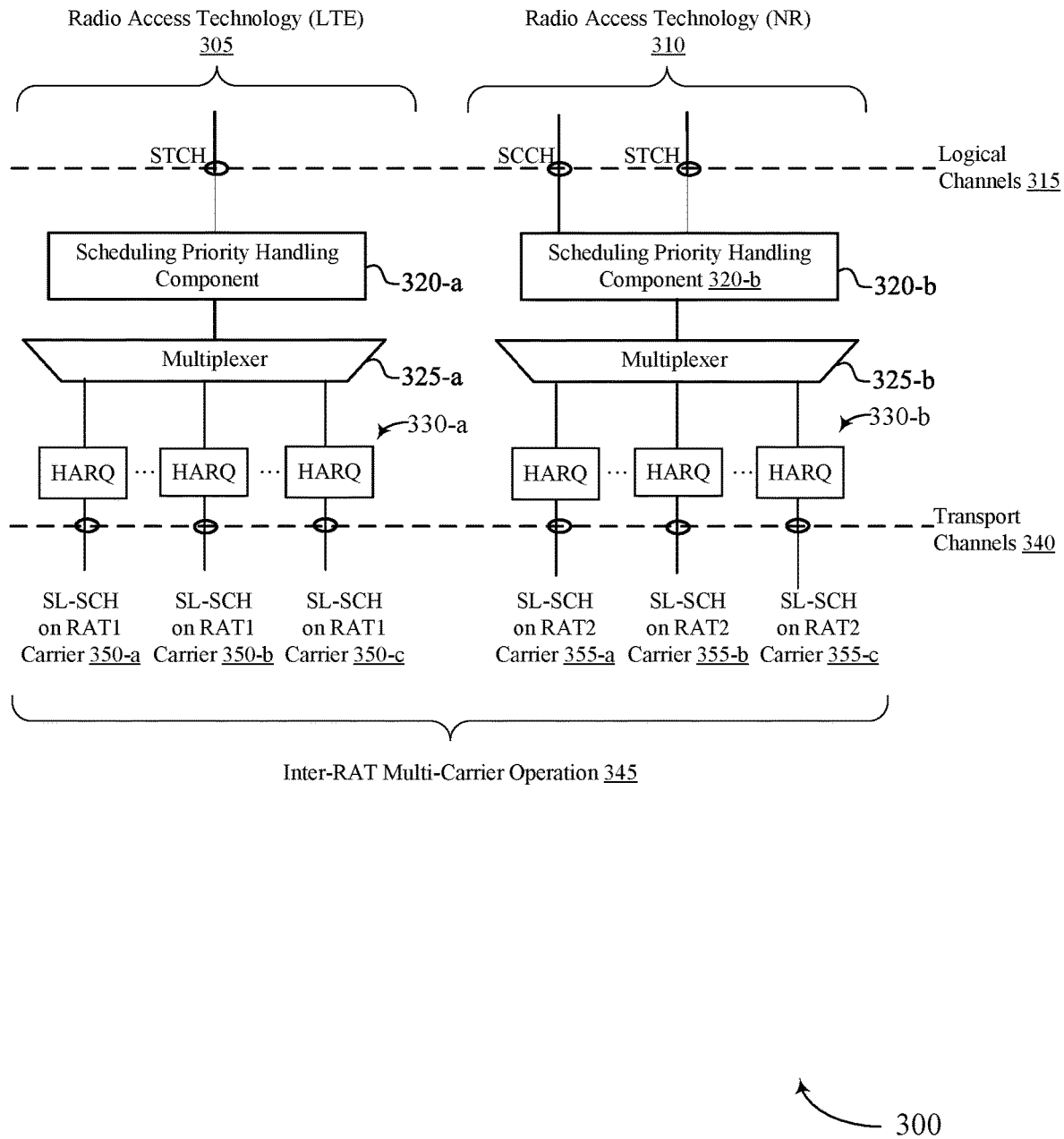
FIG. 3 illustrates an example of a multi-carrier operation configuration that supports managing co-channel operations for multiple radio access technologies in accordance with aspects of the present disclosure.

FIG. 3 illustrates an example of a multi-carrier operation configuration 300 that supports managing co-channel operations for multiple radio access technologies in accordance with aspects of the present disclosure. The multi-carrier operation configuration 300 may implement or be implemented by one or more aspects of the wireless communications system 100 and the wireless communications system 200. For example, the multi-carrier operation configuration 300 may be based on a configuration by a base station 105, and implemented by a UE 115 for managing co-channel operations for multiple radio access technologies. The multi-carrier operation configuration 300 may illustrate an example of a protocol stack including a MAC layer for managing co-channel operations for multiple radio access technologies. In the example of FIG. 3, some MAC operations of the MAC layer may also be omitted, and other MAC operations may be added to the MAC layer.

The multi-carrier operation configuration 300 may include a first radio access technology 305 (e.g., 4G LTE) and a second radio access technology 310 (e.g., 5G NR). Each of the first radio access technology 305 (e.g., 4G LTE) and the second radio access technology 310 (e.g., 5G NR) may be associated with one or more logical channels 315. Examples of logical channels include a broadcast control channel (BCCH) used for transmission of system information, a common control channel (CCCH) used for transmission of control information, a dedicated control channel (DCCH) used also for transmission of control information, a multicast control channel (MCCH) used for multicast transmission of control information, a dedicated traffic channel (DTCH) used for transmission of downlink or uplink data, or both, to and from a UE 115 at Uu interface, a multicast traffic channel (MTCH) used for transmission of downlink data to and from a UE 115 at Uu interface, a sidelink traffic channel (STCH) used for transmission of sidelink data at PC5 interface, or sidelink control channel (SCCH) used for transmission of sidelink control information at PC5 interface.

The first radio access technology 305 (e.g., 4G LTE) may be associated with a scheduling priority handling component 320-a, and the second radio access technology 310 (e.g., 5G NR) may be associated with a scheduling priority handling component 320-b for managing co-channel operations. The first radio access technology 305 (e.g., 4G LTE) may be associated with a multiplexer 325-*a*, and the second radio access technology 310 (e.g., 5G NR) may be associated with a multiplexer 325-*b* for managing co-channel operations. The multiplexer 325-*a* and the multiplexer 325-*b* may support multiplexing of different logical channels and mapping of the logical channels to one or more transport channels 340. In some examples, the multiplexer 325-*a* and the multiplexer 325-*b* may support multiplexing one or more HARQ 330-*a* and HARQ 330-*b*, and mapping of the logical channel to one or more transport channels 340. Examples of the one or more transport channels 340 include a broadcast channel (BCH), a downlink shared channel (DL-SCH), a multicast channel (MCH), and an uplink shared channel (UL-SCH) at Uu interface, or a sidelink shared channel (SL-SCH) at PC5 interface.

In the example of FIG. 3, a UE 115 may support an inter-RAT multi-carrier operation 345, which may include a first set of component carriers 350 (e.g., a component carriers 350-*a*, a component carriers 350-*b*, and a component carriers 350-*c*) associated with the first radio access technology (e.g., 4G LTE) and a second set of component carriers 355 (e.g., a component carriers 355-*a*, a component carriers 355-*b*, and a component carriers 355-*c*) associated with the second radio access technology (e.g., 5G NR).

Figure 4:
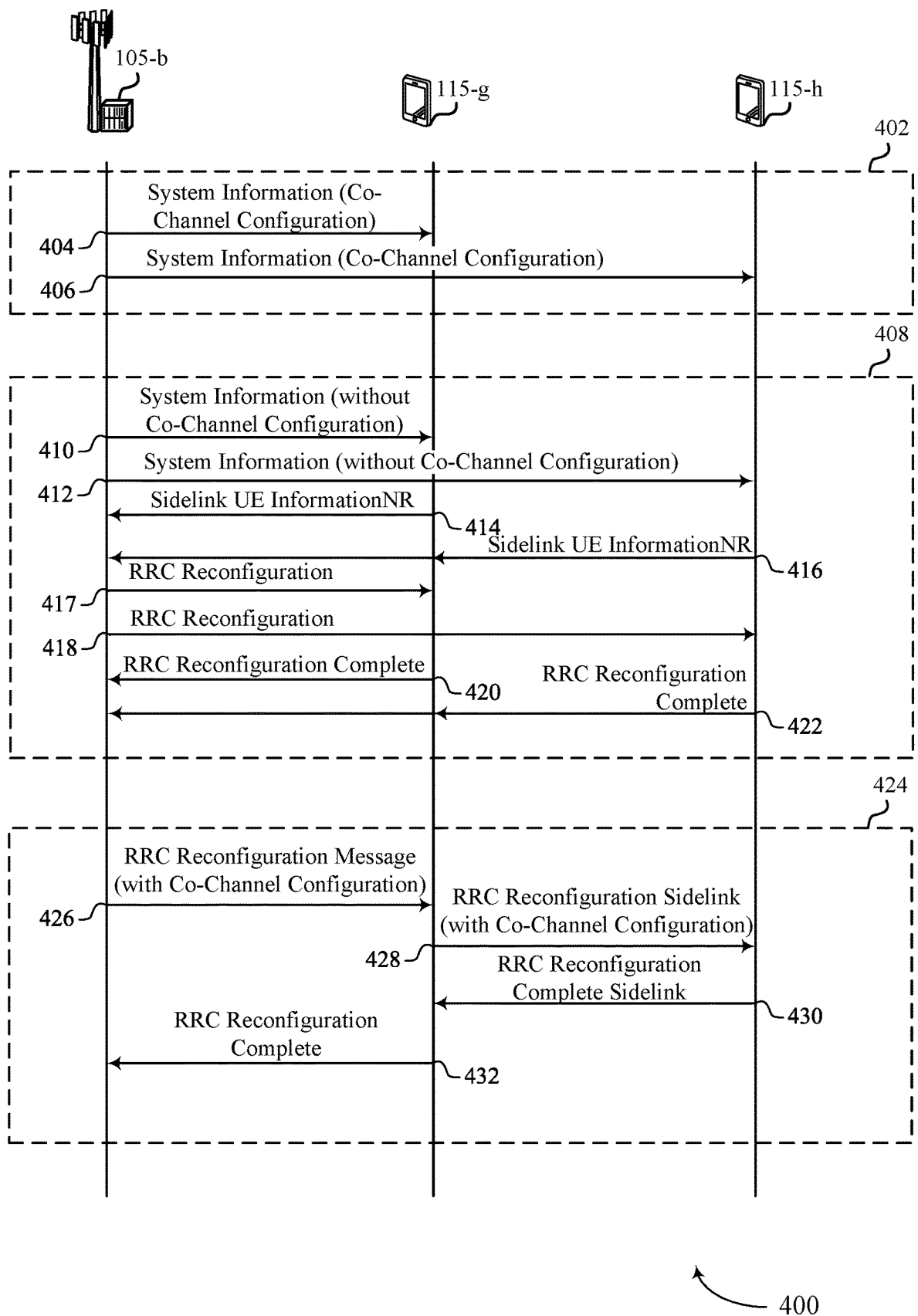
FIGS. 4 through 6 illustrate examples of process flows that support managing co-channel operations for multiple radio access technologies in accordance with aspects of the present disclosure.

FIG. 4 illustrates an example of a process flow 400 that supports managing co-channel operations for multiple radio access technologies in accordance with aspects of the present disclosure. The process flow 400 may implement or be implemented by one or more aspects of the wireless communications system 100 and the wireless communications system 200. For example, the process flow 400 may include a base station 105-*b*, a UE 115-*g*, and a UE 115-*h*, which may be examples of a base station 105 and a UE 115 described herein. The base station 105-*b* may support multiple radio access technologies, such as 4G LTE and 5G NR. The UE 115-*g* may be referred to as a transmitting UE supporting multiple radio access technologies, such as 4G LTE and 5G NR. The UE 115-*h* may be referred to as one or more receiving UEs (e.g., one receiving UE for unicast or multiple receiving UEs for groupcast or broadcast) supporting a single or multiple radio access technology, such as 5G NR or both 4G LTE and 5G NR. For a communication device, such as one or more of the UE 115-*g* or the UE 115-*h* supporting both NR V2X and LTE V2X under a geographic coverage of the base station 105-*b*, the communication device may operate with either NR resources or LTE resources managed dynamically by the base station 105-*b* for better system resource utilization. In the following description of the process flow 400, operations between the base station 105-*b*, the UE 115-*g*, and the UE 115-*h* may occur in a different order or at different times than as shown. Some operations may also be omitted from the process flow 400, and other operations may be added to the process flow 400.

According to some aspects of the process flow 400, one or more of the UE 115-*g* or the UE 115-*h* may be configured via system information to support co-channel operation as described herein, at 402, of the process flow 400. At 404, the base station 105-*b* may transmit, to the UE 115-*g* via a Uu interface, system information identifying a co-channel configuration. Similarly at 406, the base station 105-*b* may transmit, to the UE 115-*h*, system information identifying a co-channel configuration. The base station 105-*b* may transmit the system information to the UE 115-*h* via a Uu interface based at least in part on the UE 115-*h* being within the geographic coverage area of the base station 105-*b*.

Otherwise, the base station 105-*b* may transmit the system information to the UE 115-*g*, which may forward the system information to the UE 115-*h* over a sidelink (e.g., a PC5 interface). In some examples, the base station 105-*b* may transmit a SIB indicating the co-channel configuration. The SIB may be a SIB12 (e.g., sl-ConfigCommonNR) indicating the co-channel configuration. In some other examples, the base station 105-*b* may transmit other sidelink system information indicating the co-channel configuration. Thus, one or more of the UE 115-*g* or the UE 115-*h* may acquire a SIB (e.g., sl-ConfigCommonNR) or other sidelink system information identifying a co-channel configuration including a set of sidelink parameters for co-channel operation.

The base station 105-*b* may indicate, via at least one sidelink parameter of the set of sidelink parameters, whether the base station 105-*d* supports or does not support co-channel operation (e.g., a bit indication may be set to a respective value, such as sl-nr-lte-cochannel is set to "1" for supporting co-channel operation). In some examples, one or more of the UE 115-*g* or the UE 115-*h* may determine that the co-channel operation associated with the first radio access technology (e.g., 4G LTE) and the second radio access technology (e.g., 5G NR) is enabled or disabled based at least in part on the at least one sidelink parameter of the set of sidelink parameters.

In some other examples, the base station 105-*b* may indicate, via at least one sidelink parameter of the set of sidelink parameters, a set of component carriers supporting the co-channel operation associated with the first radio access technology (e.g., 4G LTE) and the second radio access technology (e.g., 5G NR). For example, the at least one sidelink parameter of the set of sidelink parameters may indicate sidelink NR carriers shared with LTE or LTE carriers shared with NR (e.g., sl-nr-lte-cochannel-carrier-list or sl-nr-lte-cochannel-carrier-combined-list). Additionally or alternatively, the at least one sidelink parameter of the set of sidelink parameters may indicate sidelink NR carriers not shared with LTE or LTE carriers not shared with NR (e.g., sl-nr-lte-cochannel-carrier-block-list or sl-nr-lte-cochannel-carrier-combined-block-list). One or more of the UE 115-*g* or the UE 115-*h* may determine the set of component carriers supporting the co-channel operation associated with the first radio access technology (e.g., 4G LTE) and the second radio access technology (e.g., 5G NR) based at least in part on the at least one sidelink parameter of the set of sidelink parameters.

The base station 105-*b* may indicate, via at least one sidelink parameter of the set of sidelink parameters, a set of sidelink resource pools based at least in part on the determined set of component carriers supporting the co-channel operation associated with the first radio access technology (e.g., 4G LTE) and the second radio access technology (e.g., 5G NR). For example, the at least one sidelink parameter of the set of sidelink parameters may indicate resource pools of carriers supporting co-channel operation. In some examples, the at least one sidelink parameter of the set of sidelink parameters may indicate non-overlapped sidelink NR pools (e.g., sl-nr-pool-list) and sidelink LTE pools (e.g., sl-lte-pool-list). In some other examples, the at least one sidelink parameter of the set of sidelink parameters may indicate overlapped or shared sidelink NR-LTE co-channel pools (e.g., sl-nr-lte-co-channel-pool-list). One or more of the UE 115-*g* or the UE 115-*h* may determine the set of sidelink resource pools based at least in part on the at least one sidelink parameter of the set of sidelink parameters. In some examples, the base station 105-*b* may indicate, via at least one sidelink parameter of the set of sidelink parameters, one or more of a measurement over the carriers or resource pools supporting co-channel operations or measurement report supporting co-channel operation. For example, one or more of an SL-RSRP measurement, a CBR measurement, a UE penetration rate (e.g., an NR UE penetration rate is based on the percentage of UEs operating with the second radio access technology over the sidelink frequency resources associated to the first radio access technology and shared with the second radio access technology for co-channel in proximity, or an LTE UE penetration rate is based on the percentage of UEs operating with the first radio access technology over the sidelink frequency resources associated to the first radio access technology and shared with the second radio access technology for co-channel in proximity), a measurement configuration with sl-MeasConfigCommon, an SL-RSRP, a CBR, or a UE penetration rate report with sl-ReportConfigCommon (e.g., EventTriggerConfig for event trigger reporting or PeriodicalReportConfig for periodic reporting, or both).

According to some aspects of the process flow 400, one or more of the UE 115-g or the UE 115-h may be configured via RRC as described herein, at 408, of the process flow 400. At 410, the base station 105-b may transmit, to the UE 115-g, system information without a co-channel configuration. For example, the base station 105-b may transmit, to the UE 115-g, a SIB12 (e.g., sl-ConfigCommonNR) without a co-channel configuration over a Uu interface. At 412, the base station 105-b may transmit, to the UE 115-h, system information without a co-channel configuration. For example, the base station 105-b may transmit, to the UE 115-h, a SIB12 (e.g., sl-ConfigCommonNR) without a co-channel configuration over a Uu interface when the UE 115-h is within coverage of the base station 105-b. Thus, while within the base station 105-b coverage, one or more of the UE 115-g or the UE 115-h support co-channel operation may acquire system information (e.g., a SIB12) without a suitable co-channel configuration (e.g., SIB12 or other sidelink system information not including a suitable co-channel configuration).

At 414, the UE 115-g may transmit, to the base station 105-b over a Uu interface, sidelink UE information, which may include UE capability or UE information for co-channel operation. Likewise, the UE 115-h may transmit, to the base station 105-b over a Uu interface, sidelink UE information, which may include UE capability or UE information for co-channel operation. Alternatively, at 416, the UE 115-h may transmit, to the UE 115-g over a PC5 interface, sidelink UE information, which may include UE capability or UE information for co-channel operation, and the UE 115-g may forward the received sidelink information to the base station 105-b over a Uu interface. As such, in the example of FIG. 4, one or more of the UE 115-g or the UE 115-h supporting co-channel operation may send UE capability or UE information for co-channel configuration to the base station 105-b (e.g., using SidelinkUEInformationNR including one or more of sl-nr-lte-cochannel-ue set to "1" for supporting co-channel operation, sl-nr-lte-cochannel-carrier-ue-list or sl-nr-lte-cochannel-carrier-combined-ue-list for co-channel, or sl-nr-lte-cochannel-carrier-block-ue-list or sl-nr-lte-cochannel-carrier-combined-block-ue-list for blocking co-channel, sl-nr-lte-cochannel-pool-share set to "1" for supporting shared resource pools, or sl-nr-lte-cochannel-meas-ue and sl-nr-lte-cochannel-report-ue for supporting one or more of SL-RSRP, CBR or UE penetration rate measurement and reporting, etc.

At 417, the base station 105-b may transmit, to the UE 115-g, an RRC reconfiguration message over a Uu interface. For example, the base station 105-b may transmit, to the UE 115-g, an RRC reconfiguration message (e.g., RRCreconfiguration with sl-ConfigDedicatedNR) indicating a co-channel configuration for co-channel operation partly based on the sidelink UE information received. At 418, the base station 105-b may transmit, to the UE 115-h, an RRC reconfiguration message over a Uu interface when the UE 115-h is within coverage of the base station 105-b. Similarly, the base station 105-b may transmit, to the UE 115-h, an RRC reconfiguration message (e.g., RRCreconfiguration with sl-ConfigDedicatedNR) indicating a co-channel configuration for co-channel operation. Thus, the base station 105-b may send an RRC reconfiguration (e.g., RRCreconfiguration with sl-ConfigDedicatedNR) indicating a co-channel configuration with one or more of the sidelink parameters of the set of sidelink parameters described herein. In some examples, the base station 105-b may indicate, via at least one sidelink parameter of the set of sidelink parameters, measurement over the carriers or resource pools supporting co-channel operations and/or measurement report supporting co-channel operation. For example, SL-RSRP or CBR or UE penetration rate measurement configuration with sl-MeasConfigInfoToAddModList and/or RSRP or CBR or UE penetration rate report with sl-ReportConfigList (e.g., EventTriggerConfig for event trigger report or PeriodicalReportConfig for periodic report, or both).

At 420, the UE 115-g may transmit, to the base station 105-b over a Uu interface, an RRC reconfiguration complete message (e.g., RRCReconfigurationComplete) for configuration acknowledgement. At 422, the UE 115-h may transmit, to the base station 105-b over a Uu interface, an RRC reconfiguration complete message (e.g., RRCReconfigurationComplete) for configuration acknowledgement. Alternatively, the UE 115-h may transmit, to the UE 115-g over a PC5 interface, an RRC reconfiguration complete sidelink message (e.g., RRCReconfigurationCompleteSidelink) for configuration acknowledgement, and the UE 115-g may forward the received acknowledgement via RRC reconfiguration complete message (e.g., RRCReconfigurationComplete) to the base station 105-b over a Uu interface.

According to some aspects of the process flow 400, the UE 115-g may be configured to forward configuration to the UE 115-h when the UE 115-h is out of the base station 105-b coverage as described herein, at 424, of the process flow 400. At 426, the base station 105-b may transmit, to the UE 115-g, an RRC reconfiguration message (e.g., RRCReconfiguration with sl-ConfigDedicatedNR) indicating a co-channel configuration. At 428, the UE 115-g may transmit (e.g., forward), to the UE 115-h, the RRC reconfiguration sidelink message (e.g., RRCReconfigurationSidelink including sl-ConfigDedicatedNR) indicating the co-channel configuration. In some examples, the UE 115-g may transmit, to the UE 115-h, an RRC reconfiguration sidelink message indicating the co-channel configuration. For example, the UE 115-g may provide the RRC reconfiguration sidelink message indicating the co-channel configuration to the UE 115-h via a PC5 RRC unicast message, a PC5 RRC groupcast message, or a PC5 RRC broadcast message.

In some examples, for the PC5 RRC unicast message, the RRC reconfiguration sidelink message transmission indicating the co-channel configuration may be on a logical channel, such as a sidelink control channel (SCCH). In some examples, for a connection-based groupcast message, the RRC reconfiguration sidelink message transmission indicating the co-channel configuration may be on a sidelink group control channel (SGCCH). In some examples, for connectionless groupcast and broadcast, the RRC reconfiguration sidelink message transmission indicating the co-channel configuration may be on a sidelink common control channel (SCCCH). At 430, the UE 115-*h* may transmit an RRC reconfiguration complete sidelink message (e.g., RRCReconfigurationCompleteSidelink) to the UE 115-*g*. At 432, the UE 115-*g* may transmit (e.g., forward), to the base station 105-*b*, the RRC reconfiguration complete (e.g., RRCReconfigurationComplete) over a Uu interface.

Figure 5:
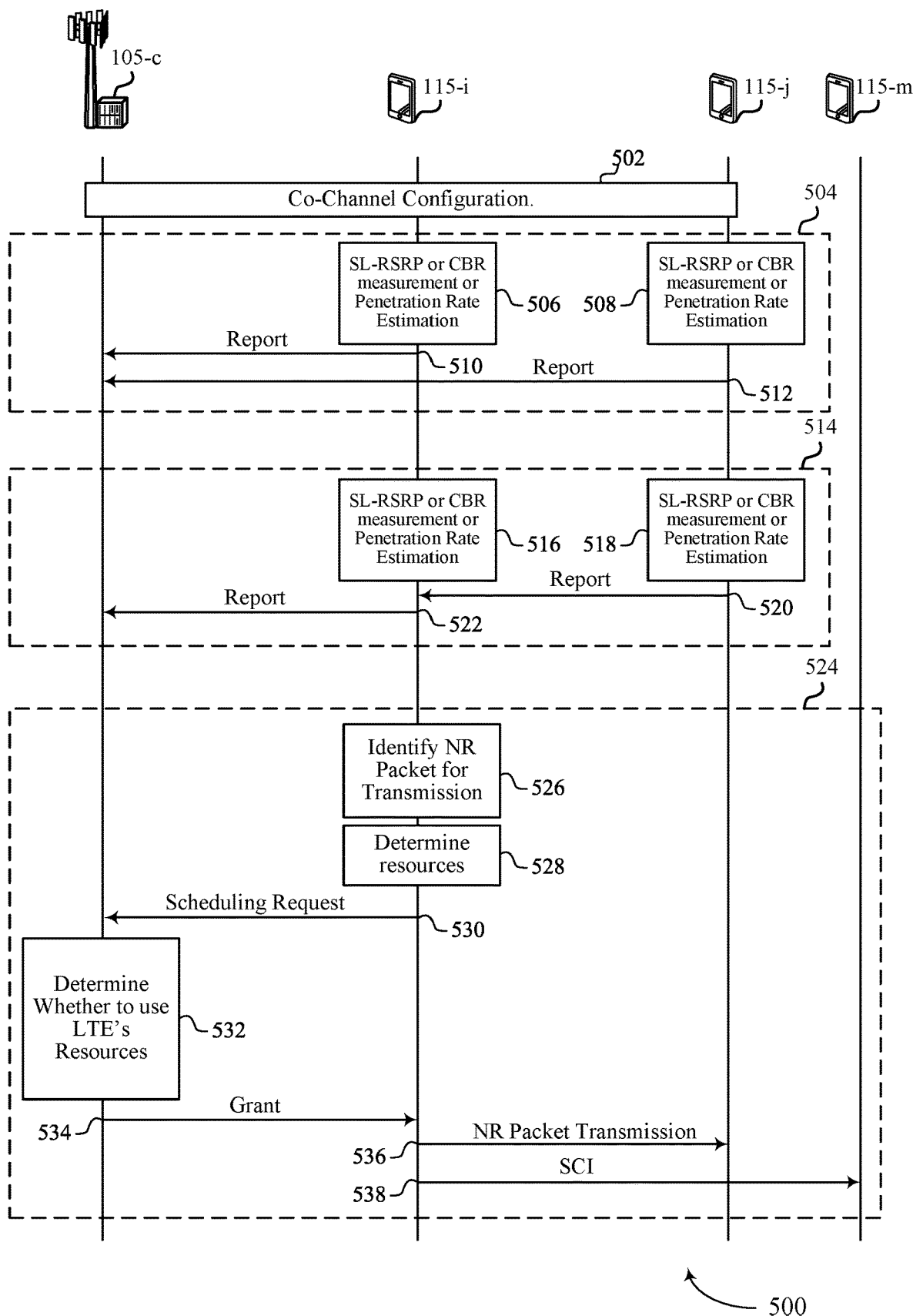

FIG. 5 illustrates an example of a process flow 500 that supports managing co-channel operations for multiple radio access technologies in accordance with aspects of the present disclosure. The process flow 500 may implement or be implemented by one or more aspects of the wireless communications system 100 and the wireless communications system 200. For example, the process flow 500 may include a base station 105-*c*, a UE 115-*i*, a UE 115-*j*, and a UE 115-*m*, which may be examples of a base station 105 and a UE 115 described herein. The base station 105-*c* may support multiple radio access technologies, such as 4G LTE and 5G NR. The UE 115-*i* may be referred to as a transmitting UE supporting multiple radio access technologies, such as 4G LTE and 5G NR. The UE 115-*j* may be referred to as a receiving UE supporting a single or multiple radio access technology, such as 5G NR or both 4G LTE and 5G NR. In some examples, the UE 115-*j* may receive sidelink communication from one or more of the UE 115-*i* or the UE 115-*m* via PC5 interface. The UE 115-*m* may be referred to as a UE in proximity supporting only a single radio access technology, such as 4G LTE. In the following description of the process flow 500, operations between the base station 105-*c*, the UE 115-*i*, and the UE 115-*j* may occur in a different order or at different times than as shown. Some operations may also be omitted from the process flow 500, and other operations may be added to the process flow 500.

At 502, the base station 105-*c* may configure one or more of the UE 115-*i* or the UE 115-*j* with a co-channel configuration. For example, the base station 105-*c* may transmit the co-channel configuration via control signaling, such as semi-static control signaling (e.g., an RRC configuration message) or dynamic control signaling (e.g., a DCI to indicate, a MAC-CE to activate, among other examples, at least one of the sidelink parameter of the set of sidelink parameters of the co-channel configuration), to one or more of the UE 115-*i* or the UE 115-*j*. The co-channel configuration may indicate a set of sidelink parameters for a co-channel operation associated with dynamically utilizing sidelink radio frequency resources allocated for a first radio access technology (e.g., 4G LTE) and sidelink radio frequency resources allocated for a second radio access technology (e.g., 5G NR).

In the example of FIG. 5, one or more of the UE 115-*i* or the UE 115-*j* may be configured to report a set of channel availability parameter values (also referred to as SL-RSRP or CBR or UE penetration rates) indicating an amount of available sidelink radio frequency resources associated with one or more of the first radio access technology (e.g., 4G LTE) or the second radio access technology (e.g., 5G NR). Additionally or alternatively, one or more of the UE 115-*i* or the UE 115-*j* may be configured to report a set of suitable resources associated with one or more of the first radio access technology (e.g., 4G LTE) or the second radio access technology (e.g., 5G NR). In some examples, the reporting may be distributed as described, at 504, in the process flow 500. In some other examples, the reporting may be aggregated as described, at 514, in the process flow 500.

According to some aspects of the process flow 500, at 506, the UE 115-*i* may perform SL-RSRP or CBR measurement and/or UE penetration rate estimation. For example, the UE 115-*i* may estimate a UE penetration rate (e.g., an NR UE penetration rate, or an LTE UE penetration rate) associated with the first radio access technology (e.g., NR UEs or LTE UEs using 4G LTE's resources) based at least in part on UE measurement (e.g., SL-RSRP or CBE measurements associated to UEs operating with the first or second radio access technology respectively over the sidelink frequency resources associated to the first radio access technology and shared with the second radio access technology for co-channel) and/or UE detection (e.g., detecting UEs operating with the first or second radio access technology respectively over the sidelink frequency resources associated to the first radio access technology and shared with the second radio access technology for co-channel). Additionally or alternatively, the UE 115-*j* may determine a set of suitable resources associated with one or more the first radio access technology (e.g., 4G LTE) or the second radio access technology (e.g., 5G NR).

For example, UE 115-*j* may determine to use a set of suitable resources associated with one or more the first radio access technology for co-channel if the SL-RSRP and/or CBR measurements over the sidelink frequency resources associated to the first radio access technology for co-channel are lower than a threshold configured via RRC or activated via MAC-CE or indicated via DCI as at least one sidelink parameter of the set of sidelink parameters for co-channel operation or are lower than the SL-RSRP and/or CBR measurements over the sidelink frequency resources associated to the second radio access technology with a margin or above a threshold configured via RRC or activated via MAC-CE or indicated via DCI as at least one sidelink parameter of the set of sidelink parameters for co-channel operation. For another example, UE 115-*j* may determine to use a set of suitable resources associated with one or more the first radio access technology for co-channel based on UE penetration rate estimated over the sidelink frequency resources associated to the first radio access technology for co-channel, e.g., comparing the NR UE penetration rate or LTE UE penetration rate with a threshold respectively configured via RRC or activated via MAC-CE or indicated via DCI as at least one sidelink parameter of the set of sidelink parameters for co-channel operation for co-channel operation. The UE 115-*i* may determine to support wireless communication (e.g., transmit or receive wireless communication) using a set of resources associated with one or more the first radio access technology (e.g., 4G LTE) or the second radio access technology (e.g., 5G NR) based at least in part on the determined suitable resources.

Similarly, at 508, the UE 115-*j* may perform SL-RSRP or CBR measurement and/or UE penetration rate (e.g., an NR UE penetration rate, or an LTE UE penetration rate) estimation. For example, the UE 115-*j* may estimate a UE penetration rate associated with the first radio access technology (e.g., 4G LTE) based at least in part on SL-RSRP or CBR measurement or UE detection. Additionally or alternatively, the UE 115-*j* may determine a set of suitable resources associated with one or more the first radio access technology (e.g., 4G LTE) or the second radio access technology (e.g., 5G NR). The UE 115-*j* may determine to support wireless communication (e.g., transmit or receive wireless communication) using a set of resources associated with one or more the first radio access technology (e.g., 4G LTE) or the second radio access technology (e.g., 5G NR) based at least in part on the determined suitable resources.

At 510, the UE 115-i may transmit a report to the base station 105-c. For example, the UE 115-i may transmit an indication of a set of channel availability parameter values (e.g., an SL-RSRP or CBR measurement or a UE penetration rate or a suitable resource, among other examples) indicating an amount of available sidelink radio frequency resources associated with one or more the first radio access technology (e.g., 4G LTE) or the second radio access technology (e.g., 5G NR). In some examples, the UE 115-i may transmit the report to the base station 105-c via a PUCCH configured via RRC or activated via MAC-CE or indicated via DCI for reporting the set of channel availability parameter values for the co-channel operation. In some other examples, the UE 115-i may transmit the report to the base station 105-c via a PUSCH configured via RRC or activated via MAC-CE or indicated via DCI for reporting the set of channel availability parameter values for the co-channel operation.

Similarly, at 512, the UE 115-j may transmit a report to the base station 105-c via a Uu interface (e.g., in the coverage of the base station 105-c). For example, the UE 115-j may transmit an indication of a set of channel availability parameter values (e.g., an SL-RSRP or CBR measurement or a UE penetration rate or a suitable resource, among other examples) indicating an amount of available sidelink radio frequency resources associated with one or more the first radio access technology (e.g., 4G LTE) or the second radio access technology (e.g., 5G NR). In some examples, the UE 115-j may transmit the report to the base station 105-b via a PUCCH configured via RRC or activated via MAC-CE or indicated via DCI for reporting the set of channel availability parameter values for the co-channel operation. In some other examples, the UE 115-j may transmit the report to the base station 105-b via a PUSCH configured via RRC or activated via MAC-CE or indicated via DCI for reporting the set of channel availability parameter values for the co-channel operation.

In the example of FIG. 5, one or more of the UE 115-i or the UE 115-j may transmit the report to the base station 105-c in a UCI using a PUCCH configured via RRC or activated via MAC-CE or indicated via DCI for the reporting. As such, one or more of the UE 115-i or the UE 115-j may use a PUCCH configured via RRC or activated via MAC-CE or indicated via DCI for reporting an SL-RSRP or a CBR measurement or a UE penetration rate with uplink control information. Additionally or alternatively, one or more of the UE 115-i or the UE 115-j may transmit the report to the base station 105-c via a PUSCH configured an SL-RSRP or a CBR measurement or a UE for reporting the set of channel availability parameter values for the co-channel operation. One or more of the UE 115-i or the UE 115-j may transmit the report to the base station 105-c in a MAC-CE using the PUSCH configured via RRC or activated via MAC-CE or indicated via DCI for the reporting. As such, one or more of the UE 115-i or the UE 115-j may use the PUSCH configured via RRC or activated via MAC-CE or indicated via DCI for reporting an SL-RSRP or a CBR measurement or a UE penetration rate with MAC-CE.

According to some other aspects of the process flow 500, at 516, the UE 115-i may perform SL-RSRP or CBR measurement and/or UE penetration rate estimation as described herein. Additionally or alternatively, the UE 115-i may determine a set of suitable resources associated with one or more the first radio access technology (e.g., 4G LTE) or the second radio access technology (e.g., 5G NR). Similarly, at 518, the UE 115-j may perform SL-RSRP or CBR measurement and/or UE penetration rate estimation as described herein. Additionally or alternatively, the UE 115-j may determine a set of suitable resources associated with one or more the first radio access technology (e.g., 4G LTE) or the second radio access technology (e.g., 5G NR).

At 520, the UE 115-j may transmit a report to the UE 115-i over a sidelink (e.g., a PC5 interface), for example, in or out of the coverage of the base station 105-c. For example, the UE 115-j may transmit an indication of a set of channel availability parameter values (e.g., SL-RSRP or CBR or UE penetration rate or a suitable resource, among other examples) indicating an amount of available sidelink radio frequency resources associated with one or more the first radio access technology (e.g., 4G LTE) or the second radio access technology (e.g., 5G NR). The UE 115-i may aggregate the report received from the UE 115-j with its own report (e.g., set of channel availability parameter values). The UE 115-i may transmit an aggregated report to the base station 105-c via a Uu interface. For example, at 522, the UE 115-i may transmit an indication of an aggregated set of channel availability parameter values associated with one or more the first radio access technology (e.g., 4G LTE) or the second radio access technology (e.g., 5G NR).

The UE 115-i may transmit the aggregated report to the base station 105-c via a PUCCH configured via RRC or activated via MAC-CE or indicated via DCI or a PUSCH configured via RRC or activated via MAC-CE or indicated via DCI. In some examples, the UE 115-i may transmit the aggregated report using multiple MAC-CEs for the multiple channel availability parameter values (e.g., SL-RSRP or CBR or UE penetration rate or a suitable resource, among other examples). As such, each MAC-CE of the multiple MAC-CEs may indicate a respective multiple channel availability parameter value (e.g., SL-RSRP or CBR or UE penetration rate or a suitable resource, among other examples). In some other examples, the UE 115-i may transmit the aggregated report using a single MAC-CE with multiple MAC-CE fields for the multiple channel availability parameter values (e.g., SL-RSRP or CBR or UE penetration rate or a suitable resource, among other examples). For example, each MAC-CE field indicating a respective multiple channel availability parameter value (e.g., SL-RSRP or CBR or UE penetration rate or a suitable resource, among other examples).

In the example of FIG. 5, the base station 105-c may enable dynamic co-channel operations for one or more of the base station 105-c, the UE 115-i, or the UE 115-j based at least in part on a dynamic grant as described, at 524, in the process flow 500. At 526, the UE 115-i may identify one or more packets (e.g., NR packets) for transmission. At 528, the UE 115-i may determine a set of suitable resources (e.g., one or more resources) for transmitting the one or more packets (e.g., NR packets). In some examples, the UE 115-i may determine the set of suitable resources based on whether to use resources associated with the first radio access technology (e.g., 4G LTE) for transmitting the one or more packets (e.g., NR packets) associated with the second radio access technology (e.g., 5G NR). For example, the UE 115-i may determine whether to use 4G LTE resources for transmitting one or more NR packets. In some examples, the UE 115-i may determine whether to use 4G LTE resources for transmitting one or more NR packets based at least in part on a QoS (e.g., latency or reliability or priority) associated with the one or more NR packets, an SL-RSRP or CBR or estimated UE penetration rate, or one or more suitable resources associated with NR or LTE resource pools.

At 530, the UE 115-i may transmit a scheduling request to the base station 105-c. In some examples, the UE 115-i may transmit the scheduling request to the base station 105-c using one or more resources associated with the first radio access technology (e.g., 4G LTE), which may be implicitly indicated (e.g., using one or more 4G LTE resources) at one or more specific scheduling request occasions configured via RRC or activated via MAC-CE or indicated via DCI by the base station 105-c for co-channel operation or which may be explicitly indicated at one or more regular scheduling request occasions configured via RRC or activated via MAC-CE or indicated via DCI by the base station 105-c with an indication with a bit field (e.g., nr-lte-flag set to 1) of the scheduling request or anther control message (e.g., a grant, a DCI, an RRC, a MAC-CE, among other examples).

At 532, the base station 105-c may determine whether to use one or more resources associated with the first radio access technology for co-channel operation, for example, for the one or more packets (e.g., NR packets). For example, the base station 105-c may determine whether to use one or more resources associated with the first radio access technology (e.g., 4G LTE) for transmitting information (e.g., packets) associated with the second radio access technology (e.g., 5G NR). In some examples, the base station 105-c may determine whether to use resources using 4G LTE resources for transmitting 5G NR packets based at least in part on one or more of a network load, or an SL-RSRP or CBR measurement associated with the first radio access technology (e.g., 4G LTE) and/or second radio access technology (e.g., 5G NR) respectively reported by one or more of the UE 115-i or the UE 115-j, or a determined UE penetration rate (e.g., LTE UE penetration rate or NR UE penetration rate) based on SL-RSRP or CBR or UE penetration rate associated with the first radio access technology (e.g., 4G LTE) reported by one or more of the UE 115-k or the UE 115-1, or suitable resources reported by one or more of the UE 115-i or the UE 115-j.

At 534, the base station 105-c may transmit a dynamic grant, for example, via a DCI. The grant may indicate a resource pool associated with the first radio access technology (e.g., indicating resource pool for 4G LTE as an implicit indication for using 4G LTE's resources) for non-overlapping (e.g., not sharing frequency resources) resource pools associated with the first radio access technology (e.g., 4G LTE) and the second radio access technology (e.g., 5G NR) respectively as configured via RRC (e.g., at least one of sidelink parameters of the set of sidelink parameters for co-channel configuration) or activated via MAC CE or indicated via DCI (e.g., activating or indicating at least one of the set of sidelink parameters for co-channel configuration) by the base station 105-c. Additionally or alternatively, the grant may indicate a bit flag in the grant explicitly indicating using one or more resources associated with the first radio access technology (e.g., 4G LTE's resources) if set to "1" for overlapping or shared (e.g., sharing frequency resources) resource pools associated with the first radio access technology (e.g., 4G LTE) and the second radio access technology (e.g., 5G NR) respectively as configured via RRC (e.g., at least one of sidelink parameters of the set of sidelink parameters for co-channel configuration) or activated via MAC CE or indicated via DCI (e.g., activating or indicating at least one of the set of sidelink parameters for co-channel configuration) by the base station 105-c. Additionally or alternatively, the grant may indicate a request (e.g., a flag for reporting set to 1) for SL-RSRP or CBR or UE penetration rate or suitable resource reporting and/or the associated reporting occasions using PUCCH or PUSCH. At 536, the UE 115-i may transmit the one or more packets (e.g., NR packets) to the UE 115-j. For example, the UE 115-i may send one or multiple transmissions of the one or more packets (e.g., NR packets) to the UE 115-j per the grant received from the base station 105-c. At 538, the UE 115-i may transmit an SCI to the UE(s) supporting only the first radio access technology (e.g., the UE 115-m for 4G LTE only) over a sidelink (e.g., a PC5 interface). The SCI may be an SCI using the first radio access technology (e.g., LTE's SCI) indicating one or more of used and reserved resources based at least in part on the DCI indicating a 4G LTE resource pool (e.g., as an implicit indication) or the bit flag (e.g., LTE-flag) set to "1" (e.g., as an explicit indication).

Figure 6:
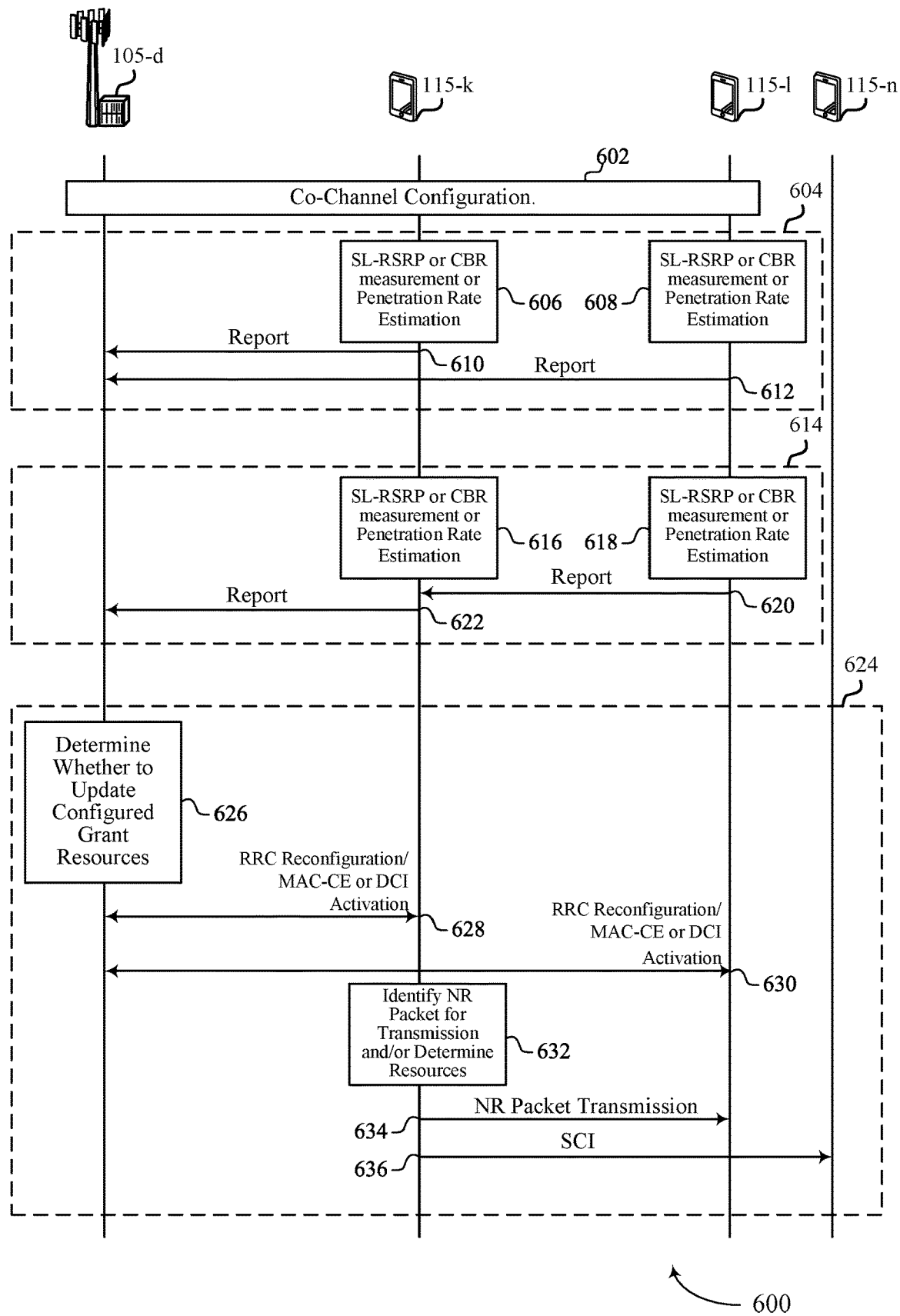

FIG. 6 illustrates an example of a process flow 600 that supports managing co-channel operations for multiple radio access technologies in accordance with aspects of the present disclosure. The process flow 600 may implement or be implemented by one or more aspects of the wireless communications system 100 and the wireless communications system 200. For example, the process flow 600 may include a base station 105-d, a UE 115-k, a UE 115-1, and a UE 115-n, which may be examples of a base station 105 and a UE 115 described herein. The base station 105-d may support multiple radio access technologies, such as 4G LTE and 5G NR. The UE 115-k may be referred to as a transmitting UE supporting multiple radio access technologies, such as 4G LTE and 5G NR. The UE 115-1 may be referred to as one or more receiving UEs (e.g., one receiving UE for unicast or more receiving UEs for groupcast or broadcast) supporting a single or multiple radio access technology, such as 5G NR or both 4G LTE and 5G NR. The UE 115-n may be referred to as a UE in proximity supporting only a single radio access technology, such as 4G LTE. In the following description of the process flow 600, operations between the base station 105-d, the UE 115-k, and the UE 115-h may occur in a different order or at different times than as shown. Some operations may also be omitted from the process flow 600, and other operations may be added to the process flow 600.

At 602, the base station 105-d may configure one or more of the UE 115-k or the UE 115-1 with a co-channel configuration. For example, the base station 105-d may transmit the co-channel configuration via control signaling, such as semi-static control signaling (e.g., an RRC configuration message) or dynamic control signaling (e.g., a DCI to indicate, a MAC-CE to activate, among other examples, at least one of the sidelink parameter of the set of sidelink parameters of the co-channel configuration), to one or more of the UE 115-k or the UE 115-1. The co-channel configuration may indicate a set of sidelink parameters for a co-channel operation associated with dynamically utilizing sidelink radio frequency resources allocated for a first radio access technology (e.g., 4G LTE) and sidelink radio frequency resources allocated for a second radio access technology (e.g., 5G NR).

In the example of FIG. 6, one or more of the UE 115-k or the UE 115-1 may be configured to report a set of channel availability parameter values (also referred to as SL-RSRP or CBR or UE penetration rates) indicating an amount of available sidelink radio frequency resources associated with one or more of the first radio access technology (e.g., 4G LTE) or the second radio access technology (e.g., 5G NR). Additionally or alternatively, one or more of the UE 115-k or the UE 115-1 may be configured to report a set of suitable resources associated with one or more of the first radio access technology (e.g., 4G LTE) or the second radio access technology (e.g., 5G NR). In some examples, the reporting may be distributed as described, at 604, in the process flow 600. In some other examples, the reporting may be aggregated as described, at 614, in the process flow 600.

According to some aspects of the process flow 600, at 606, the UE 115-*k* may perform SL-RSRP or CBR measurement and/or UE penetration rate estimation. For example, the UE 115-*k* may estimate a UE penetration rate (e.g., an NR UE penetration rate, or an LTE UE penetration rate) associated with the first radio access technology (e.g., NR UEs or LTE UEs using 4G LTE's resources) based at least in part on UE measurement (e.g., SL-RSRP or CBE measurements associated to UEs operating with the first or second radio access technology respectively over the sidelink frequency resources associated to the first radio access technology and shared with the second radio access technology for co-channel) or UE detection (e.g., detecting UEs operating with the first or second radio access technology respectively over the sidelink frequency resources associated to the first radio access technology and shared with the second radio access technology for co-channel). Additionally or alternatively, the UE 115-*k* may determine a set of suitable resources associated with one or more the first radio access technology (e.g., 4G LTE) or the second radio access technology (e.g., 5G NR). The UE 115-*k* may determine to support wireless communication (e.g., transmit or receive wireless communication) using a set of resources associated with one or more the first radio access technology (e.g., 4G LTE) or the second radio access technology (e.g., 5G NR) based at least in part on the determined suitable resources.

Similarly, at 608, the UE 115-1 may perform SL-RSRP or CBR measurement and/or UE penetration rate (e.g., an NR UE penetration rate, or an LTE UE penetration rate) estimation. For example, the UE 115-1 may estimate a UE penetration rate associated with the first radio access technology (e.g., 4G LTE) based at least in part on SL-RSRP or CBR measurement or UE detection. Additionally or alternatively, the UE 115-1 may determine a set of suitable resources associated with one or more the first radio access technology (e.g., 4G LTE) or the second radio access technology (e.g., 5G NR). The UE 115-1 may determine to support wireless communication (e.g., transmit or receive wireless communication) using a set of resources associated with one or more the first radio access technology (e.g., 4G LTE) or the second radio access technology (e.g., 5G NR) based at least in part on the determined suitable resources.

At 610, the UE 115-*k* may transmit a report to the base station 105-*d*. For example, the UE 115-*k* may transmit an indication of a set of channel availability parameter values (e.g., an SL-RSRP or CBR measurement or a UE penetration rate or a suitable resource, among other examples) indicating an amount of available sidelink radio frequency resources associated with one or more the first radio access technology (e.g., 4G LTE) or the second radio access technology (e.g., 5G NR). In some examples, the UE 115-*k* may transmit the report to the base station 105-*d* via a PUCCH configured via RRC (e.g., for configured grant type 1 or type 2) or activated via MAC-CE or DCI (e.g., for configured grant type 2) for reporting the set of channel availability parameter values for the co-channel operation. In some other examples, the UE 115-*k* may transmit the report to the base station 105-*d* via a PUSCH configured via RRC (e.g., for configured grant type 1 or type 2) or activated via MAC-CE or DCI (e.g., for configured grant type 2) for reporting the set of channel availability parameter values for the co-channel operation.

Similarly, at 612, the UE 115-1 may transmit a report to the base station 105-*d* via a Uu interface (e.g., in the coverage of the base station 105-*d*). For example, the UE 115-1 may transmit an indication of a set of channel availability parameter values (e.g., an SL-RSRP or CBR measurement or a UE penetration rate or a suitable resource, among other examples) indicating an amount of available sidelink radio frequency resources associated with one or more the first radio access technology (e.g., 4G LTE) or the second radio access technology (e.g., 5G NR). In some examples, the UE 115-1 may transmit the report to the base station 105-*d* via a PUCCH configured via RRC (e.g., for configured grant type 1 or type 2) or activated via MAC-CE or DCI (e.g., for configured grant type 2) for reporting the set of channel availability parameter values for the co-channel operation. In some other examples, the UE 115-1 may transmit the report to the base station 105-*d* via a PUSCH configured via RRC (e.g., for configured grant type 1 or type 2) or activated via MAC-CE or DCI (e.g., for configured grant type 2) for reporting the set of channel availability parameter values for the co-channel operation.

According to some other aspects of the process flow 600, at 616, the UE 115-*k* may perform SL-RSRP or CBR measurement and/or UE penetration rate estimation as described herein. Additionally or alternatively, the UE 115-*k* may determine a set of suitable resources associated with one or more the first radio access technology (e.g., 4G LTE) or the second radio access technology (e.g., 5G NR). Similarly, at 618, the UE 115-1 may perform SL-RSRP or CBR measurement and/or UE penetration rate estimation as described herein. Additionally or alternatively, the UE 115-1 may determine a set of suitable resources associated with one or more the first radio access technology (e.g., 4G LTE) or the second radio access technology (e.g., 5G NR).

At 620, the UE 115-1 may transmit a report to the UE 115-*k* over a sidelink (e.g., a PC5 interface) (e.g., in or out of coverage of the base station 105-*d*). For example, the UE 115-1 may transmit an indication of a set of channel availability parameter values (e.g., SL-RSRP or CBR or UE penetration rate or a suitable resource, among other examples) indicating an amount of available sidelink radio frequency resources associated with one or more the first radio access technology (e.g., 4G LTE) or the second radio access technology (e.g., 5G NR). The UE 115-*k* may aggregate the report received from the UE 115-1 with its own report (e.g., set of channel availability parameter values). The UE 115-*k* may transmit an aggregated report to the base station 105-*d* via a Uu interface. For example, the UE 115-*k* may transmit an indication of an aggregated set of channel availability parameter values associated with one or more the first radio access technology (e.g., 4G LTE) or the second radio access technology (e.g., 5G NR). In some examples, the UE 115-*k* may transmit, at 622, the aggregated report to the base station 105-*d* via a PUCCH or a PUSCH configured via RRC (e.g., for configured grant type 1 or type 2) or activated via MAC-CE or DCI (e.g., for configured grant type 2).

In the example of FIG. 6, the base station 105-*d* may enable static or semi-static co-channel operations for one or more of the base station 105-*d*, the UE 115-*k*, or the UE 115-1 based at least in part on a configured grant (e.g., configured grant type 1 using RRC configuration or configured grant type 2 using MAC-CE or DCI based activation or deactivation) as described, at 624, in the process flow 600. At 626, the base station 105-*d* may determine whether to update one or more configured grant resources. For example, the base station 105-*d* may determine whether to update one or more configured grant resources using resources associated with the first radio access technology (e.g., 4G LTE) for transmitting information (e.g., packets) associated with the second radio access technology (e.g., 5G NR). In some examples, the base station 105-*d* may determine whether to update one or more configured grant resources using 4G LTE resources for transmitting 5G NR packets based at least in part on one or more of a network load, or an SL-RSRP or a CBR measurement associated with the first radio access technology (e.g., 4G LTE) and/or the second radio access technology (e.g., 5G NR) respectively reported by one or more of the UE 115-k or the UE 115-1, or a determined UE penetration rate (e.g., LTE UE penetration rate or NR UE penetration rate) based on SL-RSRP or CBR or UE penetration rate associated with the first radio access technology (e.g., 4G LTE) reported by one or more of the UE 115-k or the UE 115-1, or suitable resources reported by one or more of the UE 115-k or the UE 115-1.

At 628, the base station 105-d may reconfigure the UE 115-k with an RRC reconfiguration procedure or MAC-CE or DCI activation/deactivation procedure with configured grant resources for co-channel operation. Similarly, at 630, the base station 105-d may reconfigure the UE 115-1 with an RRC reconfiguration procedure or MAC-CE or DCI activation/deactivation procedure (e.g., in the coverage of the base station 105-d); otherwise (e.g., out of the coverage of the base station 105-d), the updated configured grant resources for co-channel operation may be forwarded to UE 115-1 by UE 115-k via PC5 interface (e.g., using PC5 RRC, PC5 MAC-CE or SCI). For example, the base station 105-d may transmit, to one or more of the UE 115-k or the UE 115-1 via a Uu interface, an RRC reconfiguration message (e.g., RRCreconfiguration with an sl-ConfigDedicatedNR) indicating updated configured grant sidelink resources (e.g., for configured grant type 1 or type 2) using 4G LTE resources. In some other examples, the base station 105-d may transmit, to one or more of the UE 115-k or the UE 115-1, a MAC-CE or DCI activating updated configured grant sidelink resources (e.g., for configured grant type 2) using the resources associated to the first radio access technology (e.g., 4G LTE resources).

At 632, the UE 115-k may identify one or more packets (e.g., NR packets) for transmission. At 634, the UE 115-k may transmit the one or more packets (e.g., NR packets) to the UE 115-1. For example, the UE 115-k may determine to use the updated configured grant sidelink resources to the first radio access technology (e.g., 4G LTE resources) for co-channel operation based on SL-RSRP or CBR measurement or UE penetration rate and may send the one or more packets (e.g., NR packets) to the UE 115-1 per the updated configured grant using the resources associated to the first radio access technology (e.g., 4G LTE resources). At 636, the UE(s) supporting only the first radio access technology (e.g., UE-n for 4G LTE only) may transmit a SCI to the UE 115-1 over a sidelink (e.g., a PC5 interface). The SCI may be an SCI using the first radio access technology (e.g., LTE SCI) indicating one or more of used and reserved resources based on the updated configured grant sidelink resources to the first radio access technology (e.g., 4G LTE resources) for co-channel operation.

With reference to FIGS. 4 through 6, one or more of the UE 115-g in FIG. 4, the UE 115-i in FIG. 5, or the UE 115-k in FIG. 6, may forward a configuration or a control message to one or more of the UE 115-h in FIG. 4, the UE 115-j in FIG. 5, or the UE 115-1 in FIG. 6, using RRCReconfigurationSidelink for unicast. In some examples, one or more of the UE 115-g in FIG. 4, the UE 115-i in FIG. 5, or the UE 115-k in FIG. 6, may forward a configuration or a message to one or more of a group of UEs 115-h in FIG. 4, the UEs 115-j in FIG. 5, or the UEs 115-1 in FIG. 6, using PC5 RRC group message for groupcast. In some other examples, one or more of the UE 115-g in FIG. 4, the UE 115-i in FIG. 5, or the UE 115-k in FIG. 6, may forward a configuration or a control message to all UEs 115-h in FIG. 4, the UEs 115-j in FIG. 5, or UEs 115-1 in FIG. 6, or any combination thereof, on proximity using PC5 RRC common message for broadcast.

Figure 7:
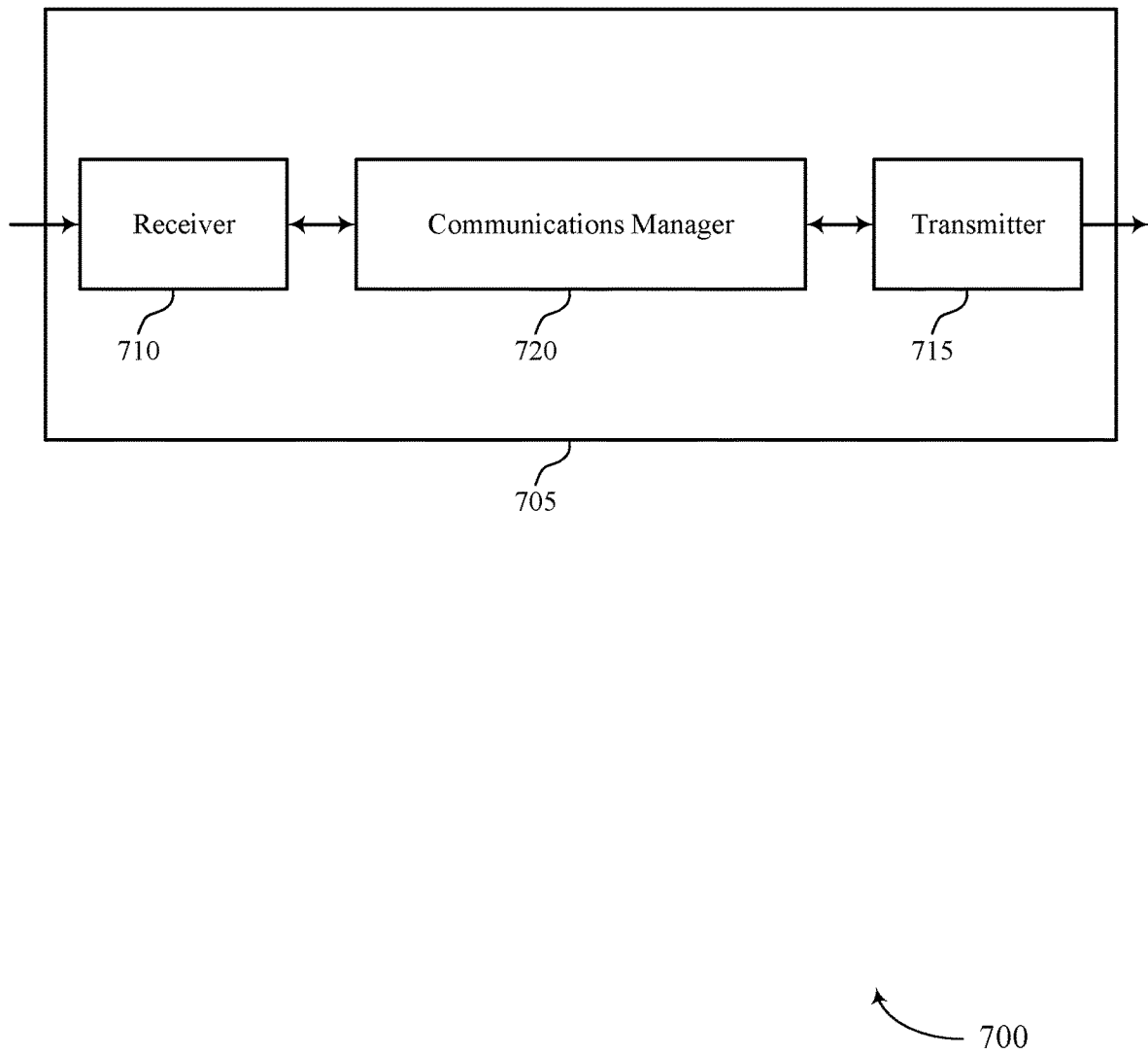
FIGS. 7 and 8 show block diagrams of devices that support managing co-channel operations for multiple radio access technologies in accordance with aspects of the present disclosure.

FIG. 7 shows a block diagram 700 of a device 705 that supports managing co-channel operations for multiple radio access technologies in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to managing co-channel operations for multiple radio access technologies). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to managing co-channel operations for multiple radio access technologies). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of managing co-channel operations for multiple radio access technologies as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at the device 705 (e.g., a UE) in accordance with examples as disclosed herein. For example, the communications manager 720 may be configured as or otherwise support a means for receiving control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology. The communications manager 720 may be configured as or otherwise support a means for transmitting, based on the received co-channel configuration, an indication of a set of channel availability parameter values indicating an amount of available sidelink radio frequency resources associated with the first radio access technology, the second radio access technology, or both. The communications manager 720 may be configured as or otherwise support a means for receiving a grant scheduling a set of sidelink resources for the wireless communication associated with the second radio access technology based on the transmitted indication of the set of channel availability parameter values for the co-channel operation.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption.

Figure 8:
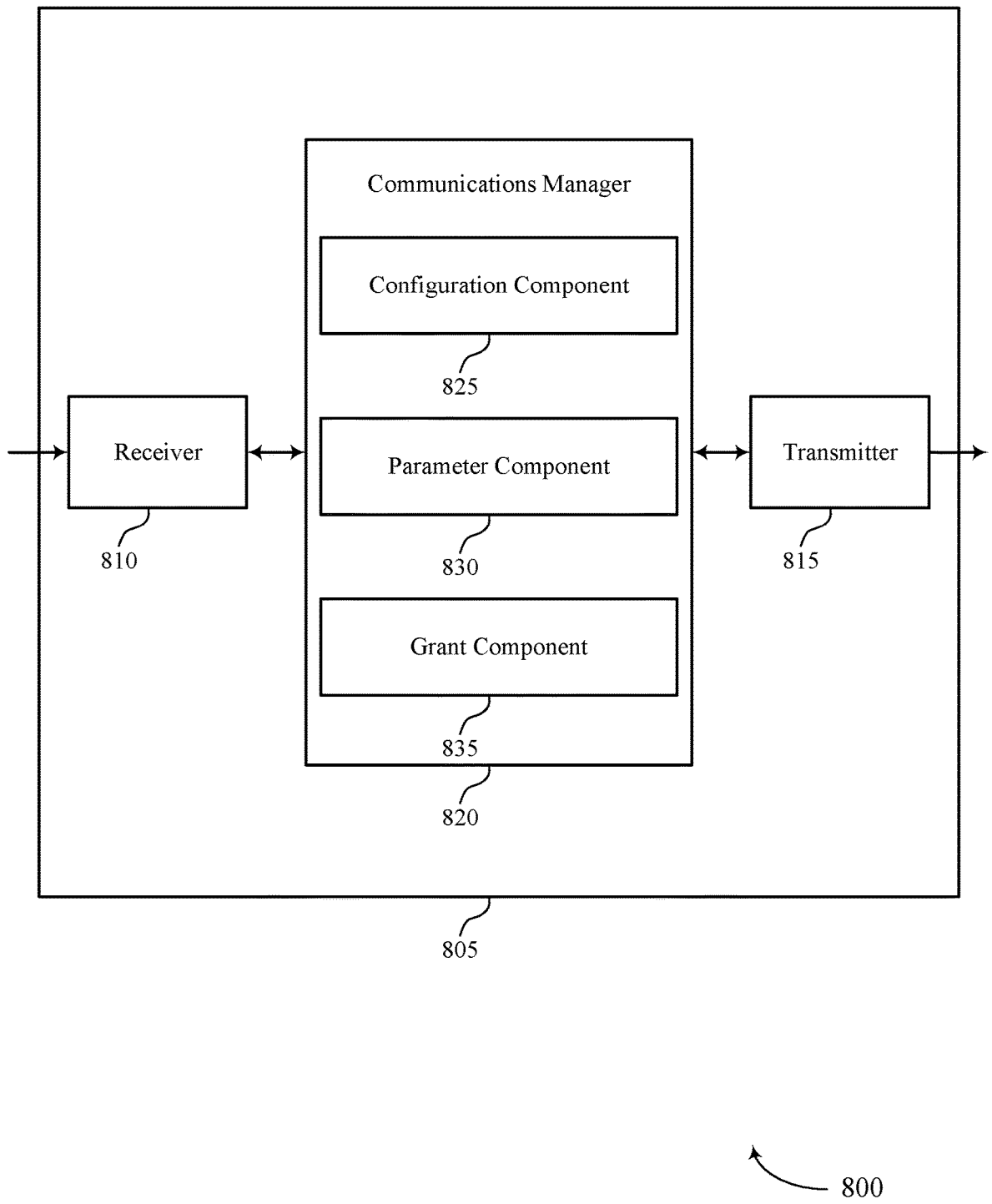

FIG. 8 shows a block diagram 800 of a device 805 that supports managing co-channel operations for multiple radio access technologies in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to managing co-channel operations for multiple radio access technologies). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to managing co-channel operations for multiple radio access technologies). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of managing co-channel operations for multiple radio access technologies as described herein. For example, the communications manager 820 may include a configuration component 825, a parameter component 830, a grant component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at the device 805 (e.g., a UE) in accordance with examples as disclosed herein. The configuration component 825 may be configured as or otherwise support a means for receiving control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology. The parameter component 830 may be configured as or otherwise support a means for transmitting, based on the received co-channel configuration, an indication of a set of channel availability parameter values indicating an amount of available sidelink radio frequency resources associated with the first radio access technology, the second radio access technology, or both. The grant component 835 may be configured as or otherwise support a means for receiving a grant scheduling a set of sidelink resources for the wireless communication associated with the second radio access technology based on the transmitted indication of the set of channel availability parameter values for the co-channel operation.

Figure 9:
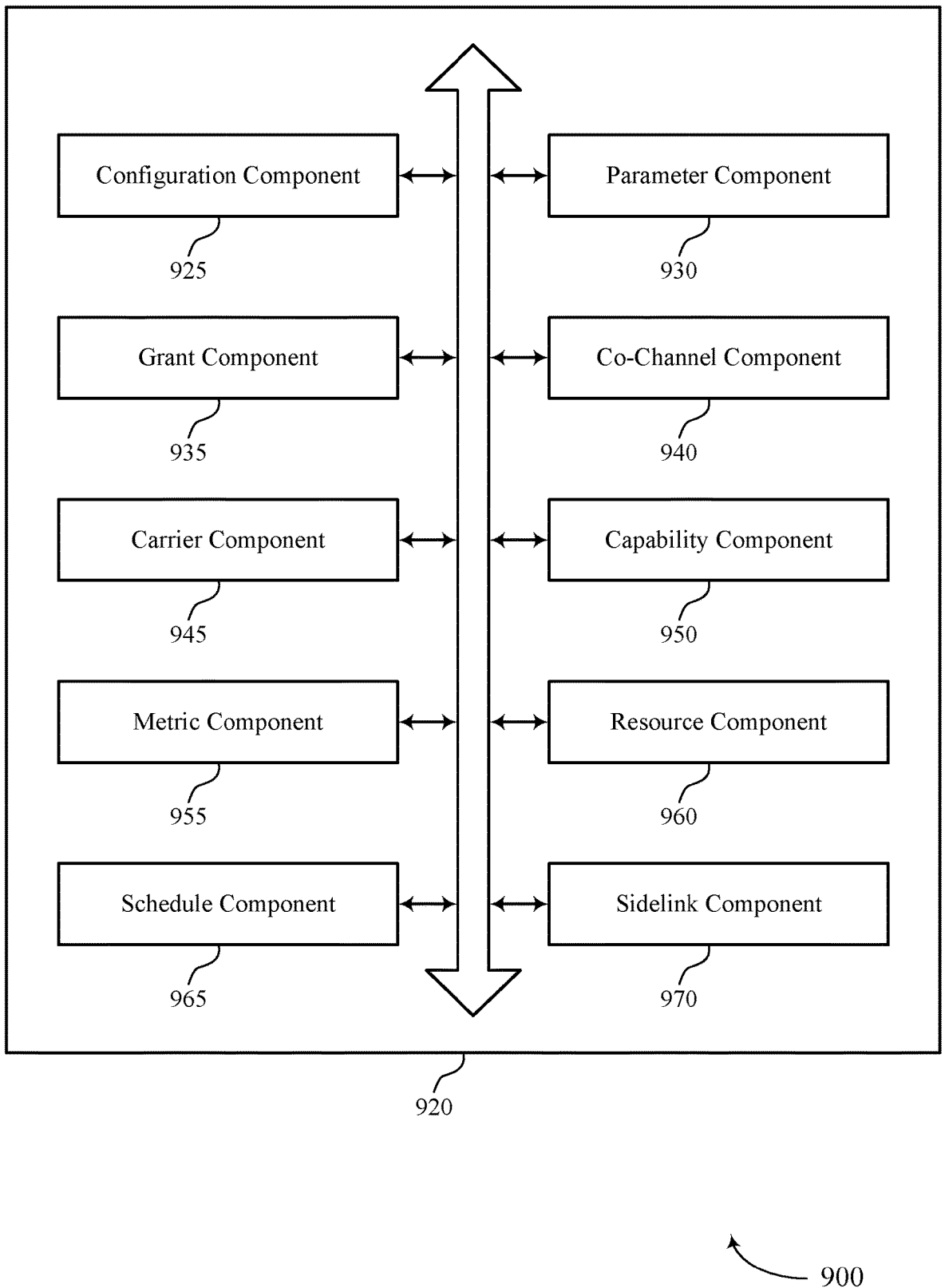
FIG. 9 shows a block diagram of a communications manager that supports managing co-channel operations for multiple radio access technologies in accordance with aspects of the present disclosure.

FIG. 9 shows a block diagram 900 of a communications manager 920 that supports managing co-channel operations for multiple radio access technologies in accordance with aspects of the present disclosure. The communications manager 920 may be an example of aspects of a communications manager 720, a communications manager 820, or both, as described herein. The communications manager 920, or various components thereof, may be an example of means for performing various aspects of managing co-channel operations for multiple radio access technologies as described herein. For example, the communications manager 920 may include a configuration component 925, a parameter component 930, a grant component 935, a co-channel component 940, a carrier component 945, a capability component 950, a metric component 955, a resource component 960, a schedule component 965, a sidelink component 970, or any combination thereof. Each of these components may communicate, directly or indirectly, with one another (e.g., via one or more buses).

The communications manager 920 may support wireless communication at a UE in accordance with examples as disclosed herein. The configuration component 925 may be configured as or otherwise support a means for receiving control signaling indicating a co-channel configuration, the co-channel configuration indicating a set of sidelink parameters for a co-channel operation associated with dynamically utilizing sidelink radio frequency spectrum allocated for a first radio access technology and sidelink radio frequency spectrum allocated for a second radio access technology. The parameter component 930 may be configured as or otherwise support a means for transmitting, based on the received control signaling, an indication of a set of channel availability parameter values indicating an amount of available sidelink radio frequency resources associated with the first radio access technology, the second radio access technology, or both. The grant component 935 may be configured as or otherwise support a means for receiving a grant scheduling a set of sidelink resources for the wireless communication based on the transmitted indication of the set of channel availability parameter values for the co-channel operation.

In some examples, the co-channel component 940 may be configured as or otherwise support a means for determining that the co-channel operation associated with the first radio access technology is enabled or disabled based on at least one sidelink parameter of the set of sidelink parameters in the received control signaling. In some examples, the at least one sidelink parameter includes a bit field indicating that the co-channel operation is enabled or disabled. In some examples, the carrier component 945 may be configured as or otherwise support a means for determining a set of component carriers supporting the co-channel operation associated with the first radio access technology and the second radio access technology based on at least one sidelink parameter of the set of sidelink parameters in the received control signaling. In some examples, the set of component carriers includes one or more of a first subset of component carriers associated with the first radio access technology indicated as shareable or un-shareable with the second radio access technology.

In some examples, the resource component 960 may be configured as or otherwise support a means for determining a set of sidelink resource pools based on the determined set of component carriers supporting the co-channel operation associated with the first radio access technology and the second radio access technology. In some examples, the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

In some examples, to support receiving the grant, the resource component 960 may be configured as or otherwise support a means for receiving a DCI indicating one or more of the first subset of sidelink resource pools associated with the first radio access technology nonoverlapping with the second subset of sidelink resource pools associated with the second radio access technology, the third subset of sidelink resource pools associated with the first radio access technology overlapping with the fourth subset of sidelink resource pools associated with the second radio access technology, or the fourth subset of sidelink resource pools associated with the second radio access technology overlapping with the third subset of sidelink resource pools associated with the first radio access technology. In some examples, to support receiving the control signaling, the configuration component 925 may be configured as or otherwise support a means for receiving an RRC message including the co-channel configuration indicating the set of sidelink parameters for the co-channel operation. In some examples, to support receiving the control signaling, the configuration component 925 may be configured as or otherwise support a means for receiving system information including the co-channel configuration indicating the set of sidelink parameters for the co-channel operation. The system information including a sidelink SIB.

In some examples, the configuration component 925 may be configured as or otherwise support a means for determining a sidelink reporting configuration for the set of channel availability parameter values based on at least one sidelink parameter of the set of sidelink parameters in the received control signaling. In some examples, the at least one sidelink parameter corresponding to one or more of sidelink measurement or sidelink reporting. In some examples, the parameter component 930 may be configured as or otherwise support a means for transmitting the indication of the set of channel availability parameter values for the co-channel operation associated with one or more of the first radio access technology or the second radio access technology based on the determined sidelink reporting configuration. In some examples, the capability component 950 may be configured as or otherwise support a means for transmitting sidelink UE information indicating that the UE supports the co-channel operation associated with the first radio access technology and the second radio access technology, the sidelink UE information corresponding to sidelink UE capability or sidelink UE assistance information, the sidelink UE capability or the sidelink UE assistance information including one or more of the set of sidelink parameters. In some examples, the configuration component 925 may be configured as or otherwise support a means for receiving the control signaling indicating the co-channel configuration based on the transmitted UE capability information.

In some examples, the parameter component 930 may be configured as or otherwise support a means for determining a PUSCH configured for reporting the set of channel availability parameter values for the co-channel operation. In some examples, the parameter component 930 may be configured as or otherwise support a means for transmitting a MAC-CE using the PUSCH, the MAC-CE including the indication of the set of channel availability parameter values for the co-channel operation associated with the second radio access technology. In some examples, the parameter component 930 may be configured as or otherwise support a means for determining a PUCCH configured for reporting the set of channel availability parameter values for the co-channel operation. In some examples, the parameter component 930 may be configured as or otherwise support a means for transmitting UCI using the PUCCH. The UCI including the indication of the set of channel availability parameter values for the co-channel operation associated with the second radio access technology.

In some examples, the parameter component 930 may be configured as or otherwise support a means for aggregating one or more channel availability parameter values into the set of channel availability parameter values for the co-channel operation based on receiving the one or more channel availability parameter values from one or more additional UEs. In some examples, the indication indicates the aggregated one or more channel availability parameter values for the co-channel operation associated with the second radio access technology. In some examples, the parameter component 930 may be configured as or otherwise support a means for determining a PUSCH configured for reporting the aggregated one or more channel availability parameter values for the co-channel operation associated with the second radio access technology. In some examples, the parameter component 930 may be configured as or otherwise support a means for transmitting a set of multiple MAC-CEs using a PUSCH, each MAC-CE of the set of multiple MAC-CEs indicating a respective channel availability parameter value of the aggregated one or more channel availability parameter values.

In some examples, the parameter component 930 may be configured as or otherwise support a means for determining a PUSCH configured for reporting the aggregated one or more channel availability parameter values for the co-channel operation associated with the second radio access technology. In some examples, the parameter component 930 may be configured as or otherwise support a means for transmitting a MAC-CE using a PUSCH. The MAC-CE including the indication of the aggregated one or more channel availability parameter values. The MAC-CE including a set of multiple MAC-CE fields, each MAC-CE field indicating a respective channel availability parameter value of the aggregated one or more channel availability parameter values.

In some examples, the metric component 955 may be configured as or otherwise support a means for determining a QoS for wireless communication associated with the second radio access technology, the QoS indicating one or more of a latency metric or a priority metric associated with the wireless communication. In some examples, the grant component 935 may be configured as or otherwise support a means for transmitting the indication of the set of channel availability parameter values for the co-channel operation associated with the first radio access technology and the second radio access technology based at least in part on determining the QoS for wireless communication associated with the second radio access technology.

In some examples, the parameter component 930 may be configured as or otherwise support a means for estimating at least one channel availability parameter value of the set of channel availability parameter values associated with the first radio access technology or the second radio access technology. In some examples, the grant component 935 may be configured as or otherwise support a means for transmitting the indication of the set of channel availability parameter values for the co-channel operation associated with the first radio access technology and the second radio access technology based at least in part on estimating the at least one channel availability parameter value of the set of channel availability parameter values associated with the first radio access technology or the second radio access technology.

In some examples, the resource component 960 may be configured as or otherwise support a means for determining a channel busy ratio for a set of component carriers associated with one or more of the first radio access technology or the second radio access technology. In some examples, the grant component 935 may be configured as or otherwise support a means for transmitting the indication of the set of channel availability parameter values for the co-channel operation associated with the first radio access technology and the second radio access technology based at least in part on determining the channel busy ratio for the set of component carriers associated with one or more of the first radio access technology or the second radio access technology.

In some examples, the schedule component 965 may be configured as or otherwise support a means for transmitting a scheduling request configured for the co-channel operation associated with the first radio access technology and the second radio access technology. In some examples, the grant component 935 may be configured as or otherwise support a means for where receiving the grant scheduling the wireless communication is based on transmitting the scheduling request configured for the co-channel operation. In some examples, at least one channel availability parameter value of the set of channel availability parameter values is based on a traffic load or a number of UEs associated with one or more of the first radio access technology or the second radio access technology.

In some examples, to support receiving the grant, the grant component 935 may be configured as or otherwise support a means for receiving a dynamic grant via a DCI including a DCI field enabling the UE to report the set of channel availability parameter values for the co-channel operation associated with one or more of the first radio access technology or the second radio access technology. In some examples, to support receiving the grant, the parameter component 930 may be configured as or otherwise support a means for transmitting the indication based on the received DCI. In some examples, the sidelink component 970 may be configured as or otherwise support a means for transmitting SCI indicating unavailable sidelink resources associated with the first radio access technology based on receiving a DCI including a DCI field indicating a set of resources associated with one or more of the first radio access technology or the second radio access technology.

In some examples, to support receiving the grant, the grant component 935 may be configured as or otherwise support a means for receiving a configured grant via an RRC message, the configured grant indicting that the set of sidelink resources are updated for the wireless communication associated with the second radio access technology, the set of sidelink resources corresponding to a set of resource associated with the first radio access technology. In some examples, to support receiving the grant, the grant component 935 may be configured as or otherwise support a means for receiving a configured grant via a DCI activating the set of sidelink resources for the wireless communication associated with the second radio access technology, the set of sidelink resources corresponding to a set of resource associated with the first radio access technology. In some examples, the first radio access technology includes 4G LTE and the second radio access technology includes 5G NR.

Figure 10:
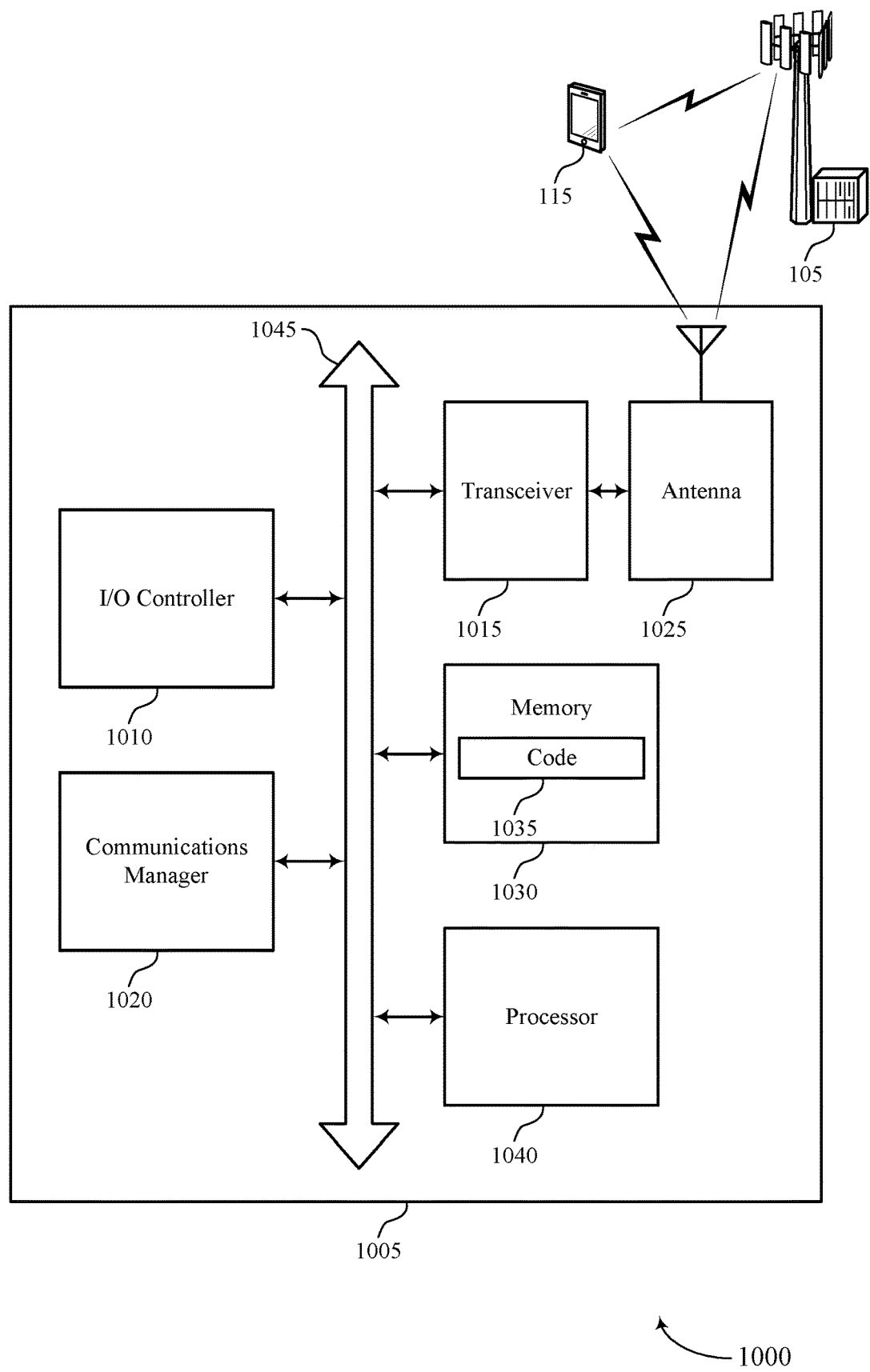
FIG. 10 shows a diagram of a system including a device that supports managing co-channel operations for multiple radio access technologies in accordance with aspects of the present disclosure.

FIG. 10 shows a diagram of a system 1000 including a device 1005 that supports managing co-channel operations for multiple radio access technologies in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting managing co-channel operations for multiple radio access technologies). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at the device 1005 (e.g., a UE) in accordance with examples as disclosed herein. For example, the communications manager 1020 may be configured as or otherwise support a means for receiving control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology. The communications manager 1020 may be configured as or otherwise support a means for transmitting, based on the received co-channel configuration, an indication of a set of channel availability parameter values indicating an amount of available sidelink radio frequency resources associated with the first radio access technology, the second radio access technology, or both. The communications manager 1020 may be configured as or otherwise support a means for receiving a grant scheduling a set of sidelink resources for the wireless communication associated with the second radio access technology based on the transmitted indication of the set of channel availability parameter values for the co-channel operation.

By including or configuring the communications manager 1020 in accordance with examples as described herein, the device 1005 may support techniques for improved communication reliability, reduced latency, reduced power consumption, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of managing co-channel operations for multiple radio access technologies as described herein, or the processor 1040 and the memory 1030 may be otherwise configured to perform or support such operations.

Figure 11:
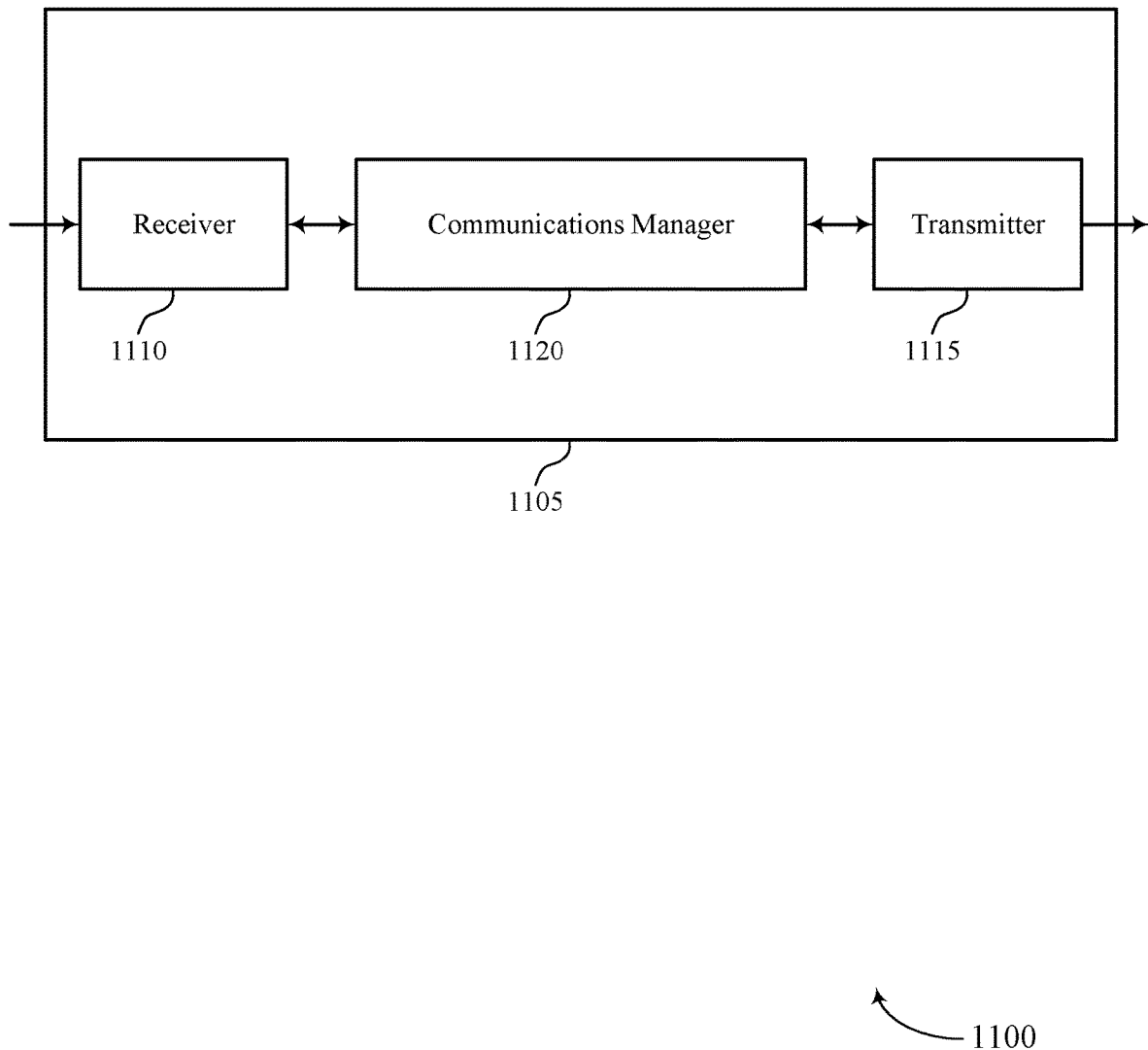
FIGS. 11 and 12 show block diagrams of devices that support managing co-channel operations for multiple radio access technologies in accordance with aspects of the present disclosure.

FIG. 11 shows a block diagram 1100 of a device 1105 that supports managing co-channel operations for multiple radio access technologies in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to managing co-channel operations for multiple radio access technologies). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to managing co-channel operations for multiple radio access technologies). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of managing co-channel operations for multiple radio access technologies as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at the device 1105 (e.g., a base station) in accordance with examples as disclosed herein. For example, the communications manager 1120 may be configured as or otherwise support a means for transmitting control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology. The communications manager 1120 may be configured as or otherwise support a means for receiving, based on the transmitted co-channel configuration, an indication of a set of channel availability parameter values indicating an amount of available sidelink radio frequency resources associated with the first radio access technology, the second radio access technology, or both. The communications manager 1120 may be configured as or otherwise support a means for transmitting a grant scheduling the wireless communication associated with the second radio access technology based on the received indication of the set of channel availability parameter values for the co-channel operation.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced power consumption.

Figure 12:
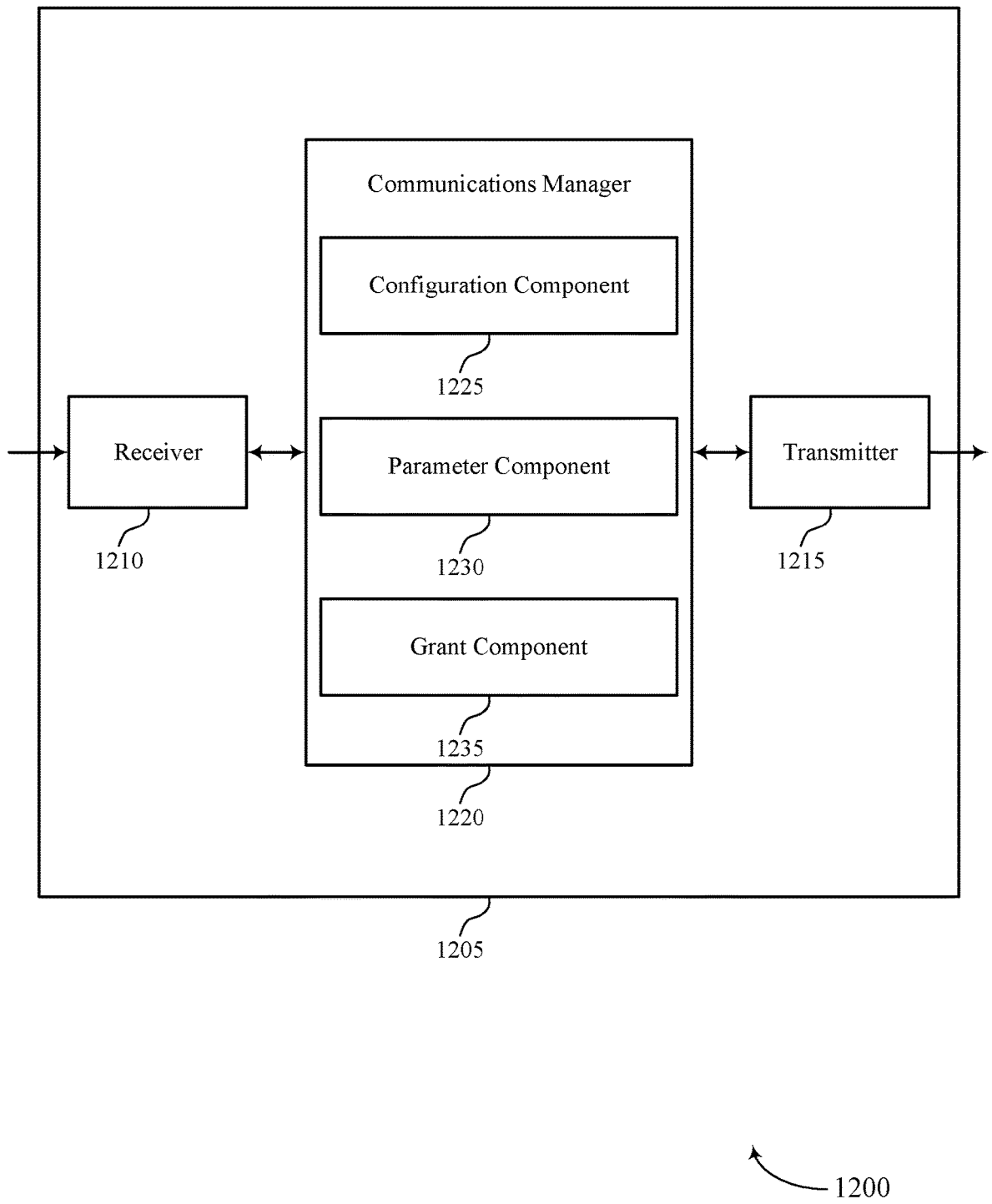

FIG. 12 shows a block diagram 1200 of a device 1205 that supports managing co-channel operations for multiple radio access technologies in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to managing co-channel operations for multiple radio access technologies). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to managing co-channel operations for multiple radio access technologies). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of managing co-channel operations for multiple radio access technologies as described herein. For example, the communications manager 1220 may include a configuration component 1225, a parameter component 1230, a grant component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at the device 1205 (e.g., a base station) in accordance with examples as disclosed herein. The configuration component 1225 may be configured as or otherwise support a means for transmitting control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology. The parameter component 1230 may be configured as or otherwise support a means for receiving, based on the transmitted co-channel configuration, an indication of a set of channel availability parameter values indicating an amount of available sidelink radio frequency resources associated with the first radio access technology, the second radio access technology, or both. The grant component 1235 may be configured as or otherwise support a means for transmitting a grant scheduling the wireless communication associated with the second radio access technology based on the received indication of the set of channel availability parameter values for the co-channel operation.

Figure 13:
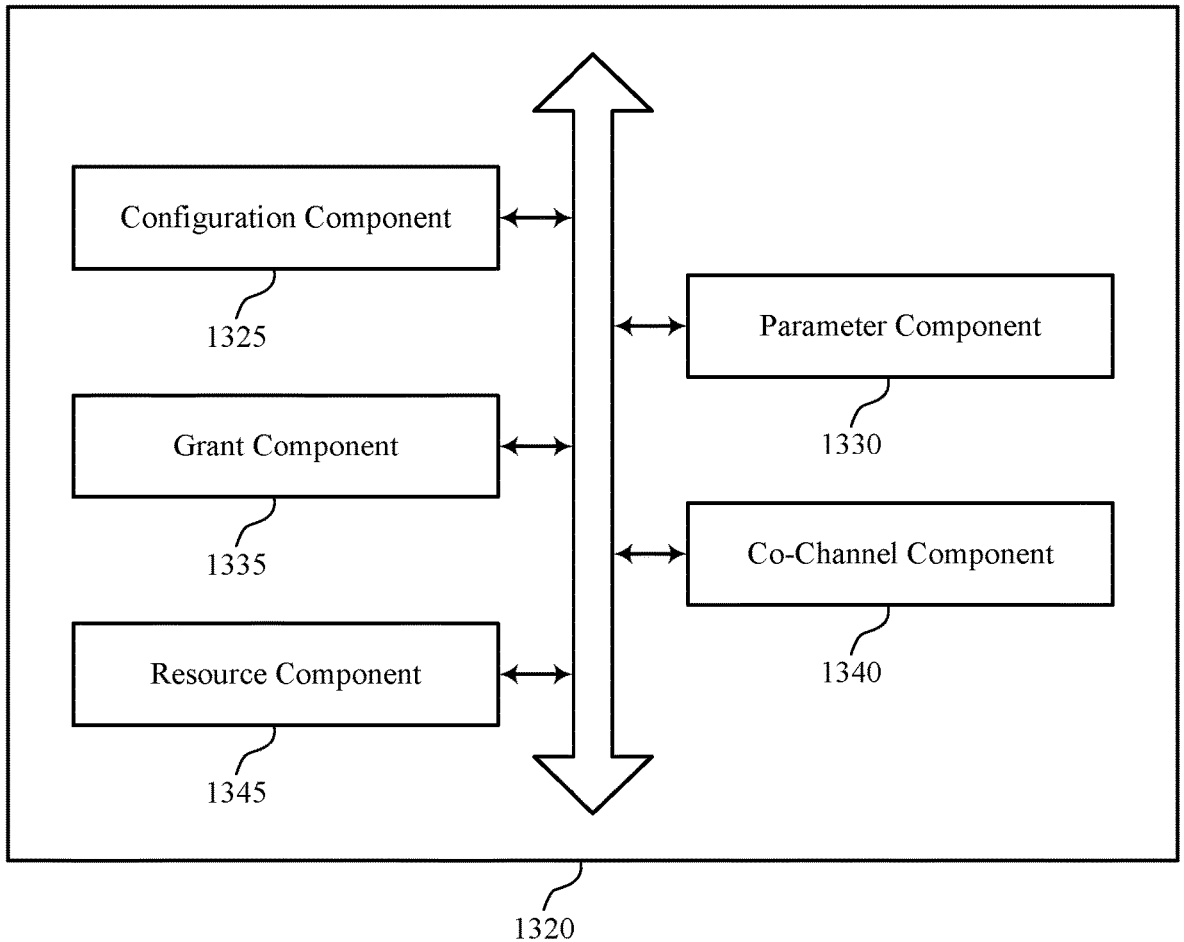
FIG. 13 shows a block diagram of a communications manager that supports managing co-channel operations for multiple radio access technologies in accordance with aspects of the present disclosure.

FIG. 13 shows a block diagram 1300 of a communications manager 1320 that supports managing co-channel operations for multiple radio access technologies in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of managing co-channel operations for multiple radio access technologies as described herein. For example, the communications manager 1320 may include a configuration component 1325, a parameter component 1330, a grant component 1335, a co-channel component 1340, a resource component 1345, or any combination thereof. Each of these components may communicate, directly or indirectly, with one another (e.g., via one or more buses).

The communications manager 1320 may support wireless communication at a base station in accordance with examples as disclosed herein. The configuration component 1325 may be configured as or otherwise support a means for transmitting control signaling indicating a co-channel configuration, the co-channel configuration indicating a set of sidelink parameters for a co-channel operation associated with dynamically utilizing sidelink radio frequency spectrum allocated for a first radio access technology and sidelink radio frequency spectrum allocated for a second radio access technology. The parameter component 1330 may be configured as or otherwise support a means for receiving, based on the transmitted co-channel configuration, an indication of a set of channel availability parameter values indicating an amount of available sidelink radio frequency resources associated with the first radio access technology, the second radio access technology, or both. The grant component 1335 may be configured as or otherwise support a means for transmitting a grant scheduling the wireless communication based on the received indication of the set of channel availability parameter values for the co-channel operation.

In some examples, to support transmitting the control signaling, the co-channel component 1340 may be configured as or otherwise support a means for transmitting an RRC message including the co-channel configuration indicating the set of sidelink parameters for the co-channel operation. In some examples, to support transmitting the control signaling, the co-channel component 1340 may be configured as or otherwise support a means for transmitting system information including the co-channel configuration indicating the set of sidelink parameters for the co-channel operation. The system information including a sidelink SIB. In some examples, to support transmitting the grant, the resource component 1345 may be configured as or otherwise support a means for transmitting a DCI indicating one or more of a first subset of sidelink resource pools associated with the first radio access technology nonoverlapping with a second subset of sidelink resource pools associated with the second radio access technology, a third subset of sidelink resource pools associated with the first radio access technology overlapping with a fourth subset of sidelink resource pools associated with the second radio access technology, or the fourth subset of sidelink resource pools associated with the second radio access technology overlapping with the third subset of sidelink resource pools associated with the first radio access technology.

Figure 14:
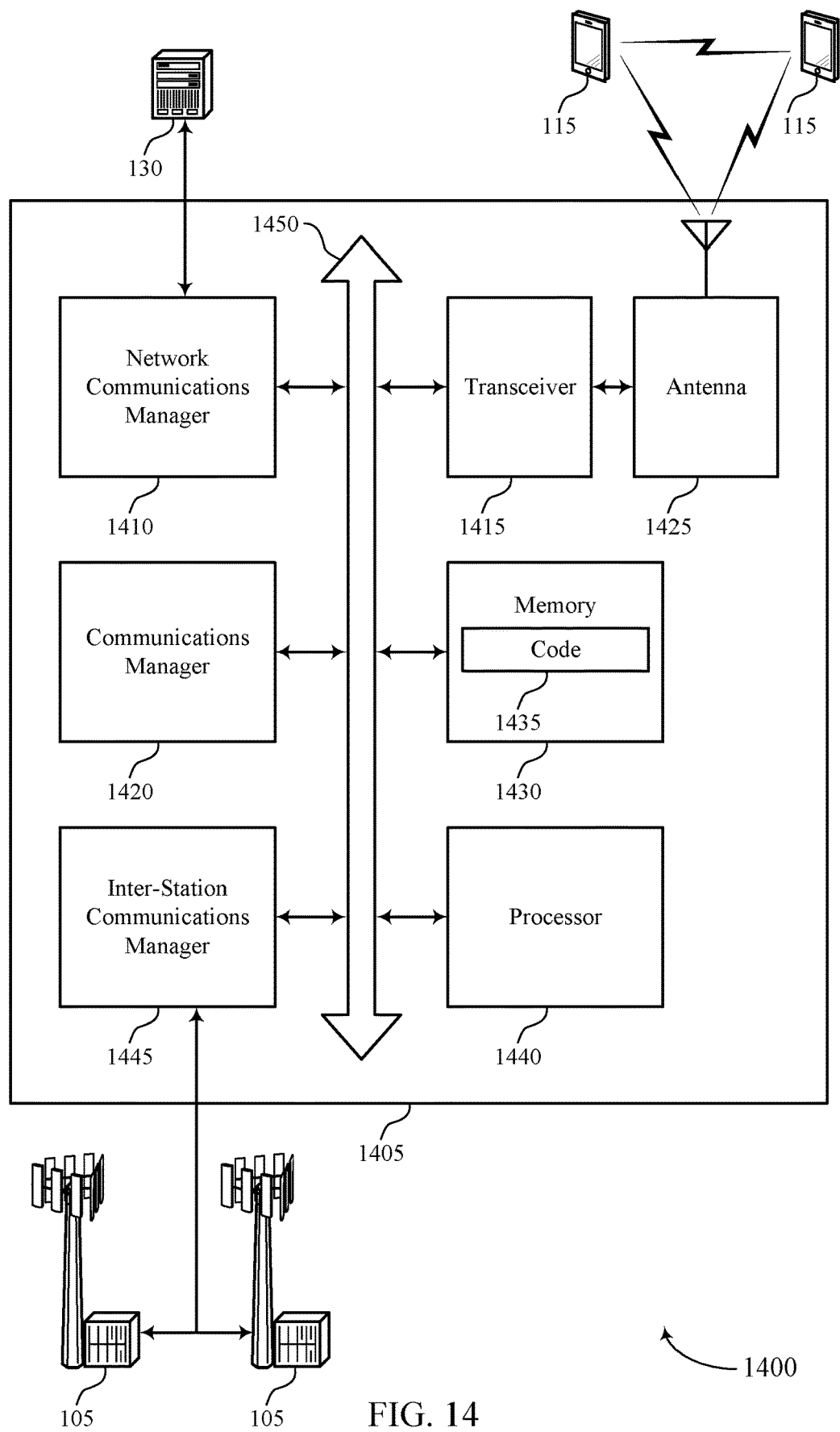
FIG. 14 shows a diagram of a system including a device that supports managing co-channel operations for multiple radio access technologies in accordance with aspects of the present disclosure.

FIG. 14 shows a diagram of a system 1400 including a device 1405 that supports managing co-channel operations for multiple radio access technologies in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting managing co-channel operations for multiple radio access technologies). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at the device 1405 (e.g., a base station) in accordance with examples as disclosed herein. For example, the communications manager 1420 may be configured as or otherwise support a means for transmitting control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology. The communications manager 1420 may be configured as or otherwise support a means for receiving, based on the transmitted co-channel configuration, an indication of a set of channel availability parameter values indicating an amount of available sidelink radio frequency resources associated with the first radio access technology, the second radio access technology, or both. The communications manager 1420 may be configured as or otherwise support a means for transmitting a grant scheduling the wireless communication associated with the second radio access technology based on the received indication of the set of channel availability parameter values for the co-channel operation.

By including or configuring the communications manager 1420 in accordance with examples as described herein, the device 1405 may support techniques for improved communication reliability, reduced latency, reduced power consumption, more efficient utilization of communication resources, and improved coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of managing co-channel operations for multiple radio access technologies as described herein, or the processor 1440 and the memory 1430 may be otherwise configured to perform or support such operations.

Figure 15:
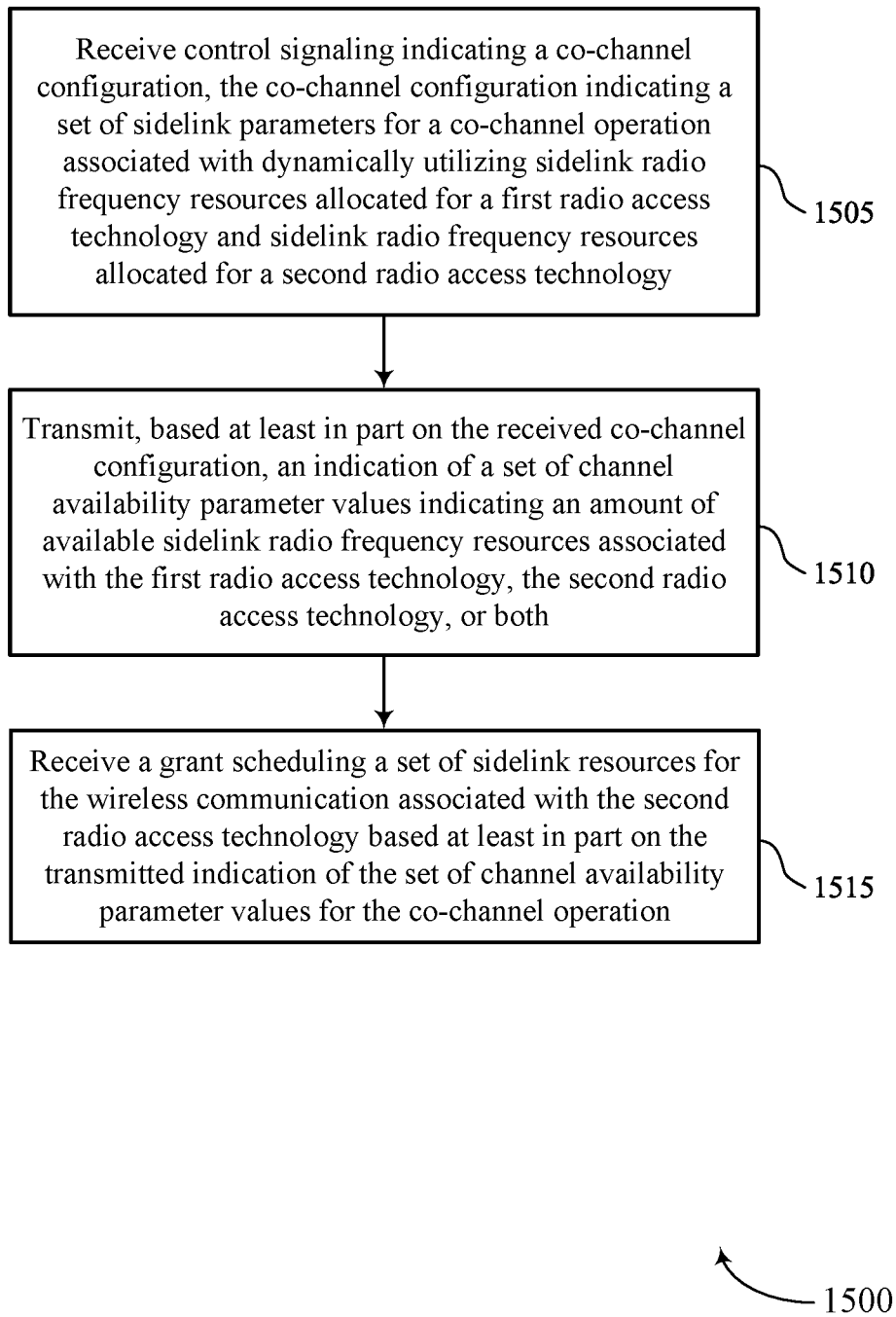
FIGS. 15 through 18 show flowcharts illustrating methods that support managing co-channel operations for multiple radio access technologies in accordance with aspects of the present disclosure.

FIG. 15 shows a flowchart illustrating a method 1500 that supports managing co-channel operations for multiple radio access technologies in accordance with aspects of the present disclosure. The operations of the method 1500 may be implemented by a UE or its components as described herein. For example, the operations of the method 1500 may be performed by a UE as described with reference to FIGS. 1 through 10. In some examples, a UE may execute a set of instructions to control the functional elements of the UE to perform the described functions. Additionally or alternatively, a UE may perform aspects of the described functions using special-purpose hardware.

At 1505, the method may include receiving control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology. The operations of 1505 may be performed in accordance with examples as disclosed herein. In some examples, aspects of the operations of 1505 may be performed by a configuration component 925 as described with reference to FIG. 9.

At 1510, the method may include transmitting, based on the received co-channel configuration, an indication of a set of channel availability parameter values indicating an amount of available sidelink radio frequency resources associated with the first radio access technology, the second radio access technology, or both. The operations of 1510 may be performed in accordance with examples as disclosed herein. In some examples, aspects of the operations of 1510 may be performed by a parameter component 930 as described with reference to FIG. 9.

At 1515, the method may include receiving a grant scheduling a set of sidelink resources for the wireless communication associated with the second radio access technology based on the transmitted indication of the set of channel availability parameter values for the co-channel operation. The operations of 1515 may be performed in accordance with examples as disclosed herein. In some examples, aspects of the operations of 1515 may be performed by a grant component 935 as described with reference to FIG. 9.

Figure 16:
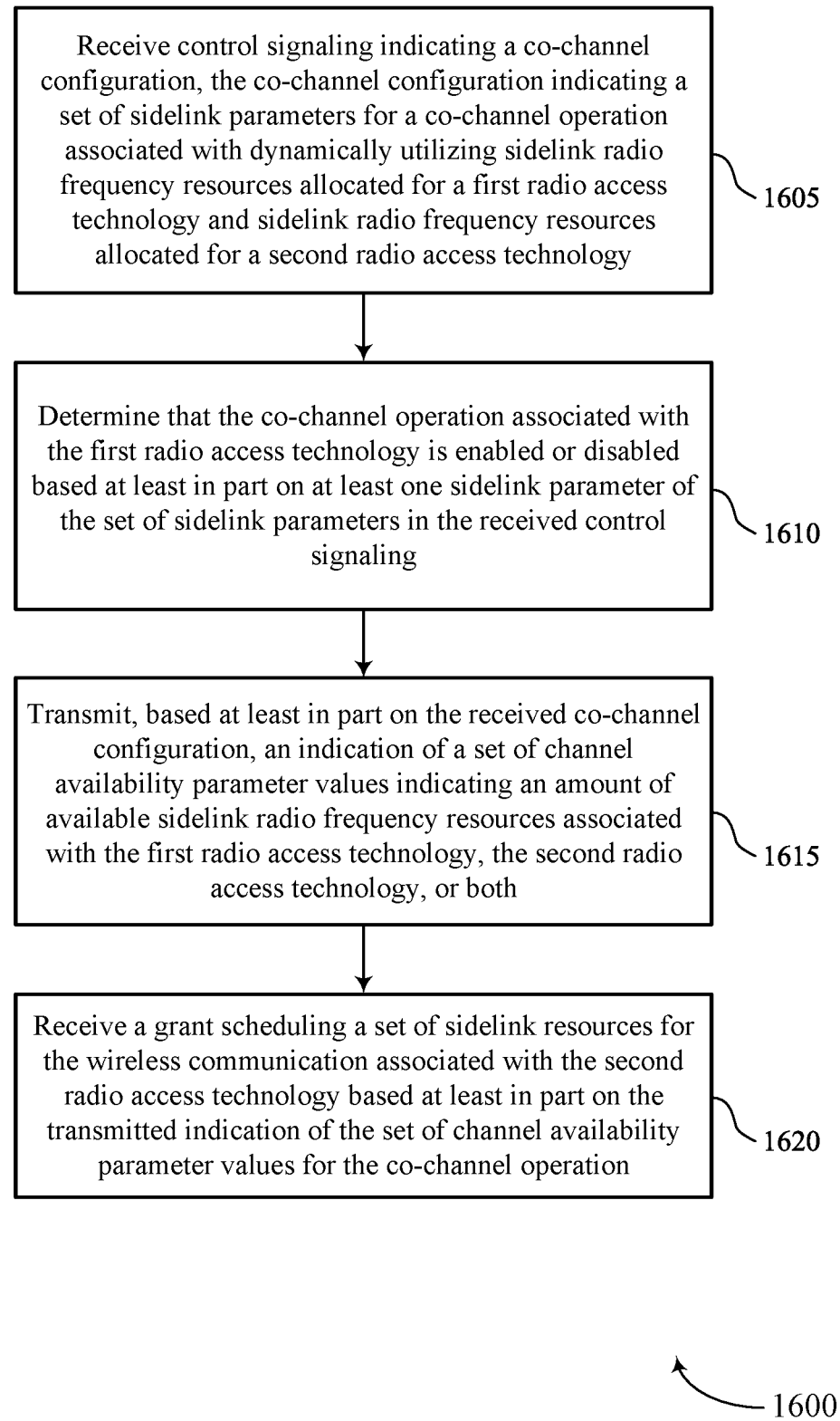

FIG. 16 shows a flowchart illustrating a method 1600 that supports managing co-channel operations for multiple radio access technologies in accordance with aspects of the present disclosure. The operations of the method 1600 may be implemented by a UE or its components as described herein. For example, the operations of the method 1600 may be performed by a UE as described with reference to FIGS. 1 through 10. In some examples, a UE may execute a set of instructions to control the functional elements of the UE to perform the described functions. Additionally or alternatively, a UE may perform aspects of the described functions using special-purpose hardware.

At 1605, the method may include receiving control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology. The operations of 1605 may be performed in accordance with examples as disclosed herein. In some examples, aspects of the operations of 1605 may be performed by a configuration component 925 as described with reference to FIG. 9.

At 1610, the method may include determining that the co-channel operation associated with the first radio access technology is enabled or disabled based on at least one sidelink parameter of the set of sidelink parameters in the received control signaling. The operations of 1610 may be performed in accordance with examples as disclosed herein. In some examples, aspects of the operations of 1610 may be performed by a co-channel component 940 as described with reference to FIG. 9.

At 1615, the method may include transmitting, based on the received co-channel configuration, an indication of a set of channel availability parameter values indicating an amount of available sidelink radio frequency resources associated with the first radio access technology, the second radio access technology, or both. The operations of 1615 may be performed in accordance with examples as disclosed herein. In some examples, aspects of the operations of 1615 may be performed by a parameter component 930 as described with reference to FIG. 9.

At 1620, the method may include receiving a grant scheduling a set of sidelink resources for the wireless communication associated with the second radio access technology based on the transmitted indication of the set of channel availability parameter values for the co-channel operation. The operations of 1620 may be performed in accordance with examples as disclosed herein. In some examples, aspects of the operations of 1620 may be performed by a grant component 935 as described with reference to FIG. 9.

Figure 17:
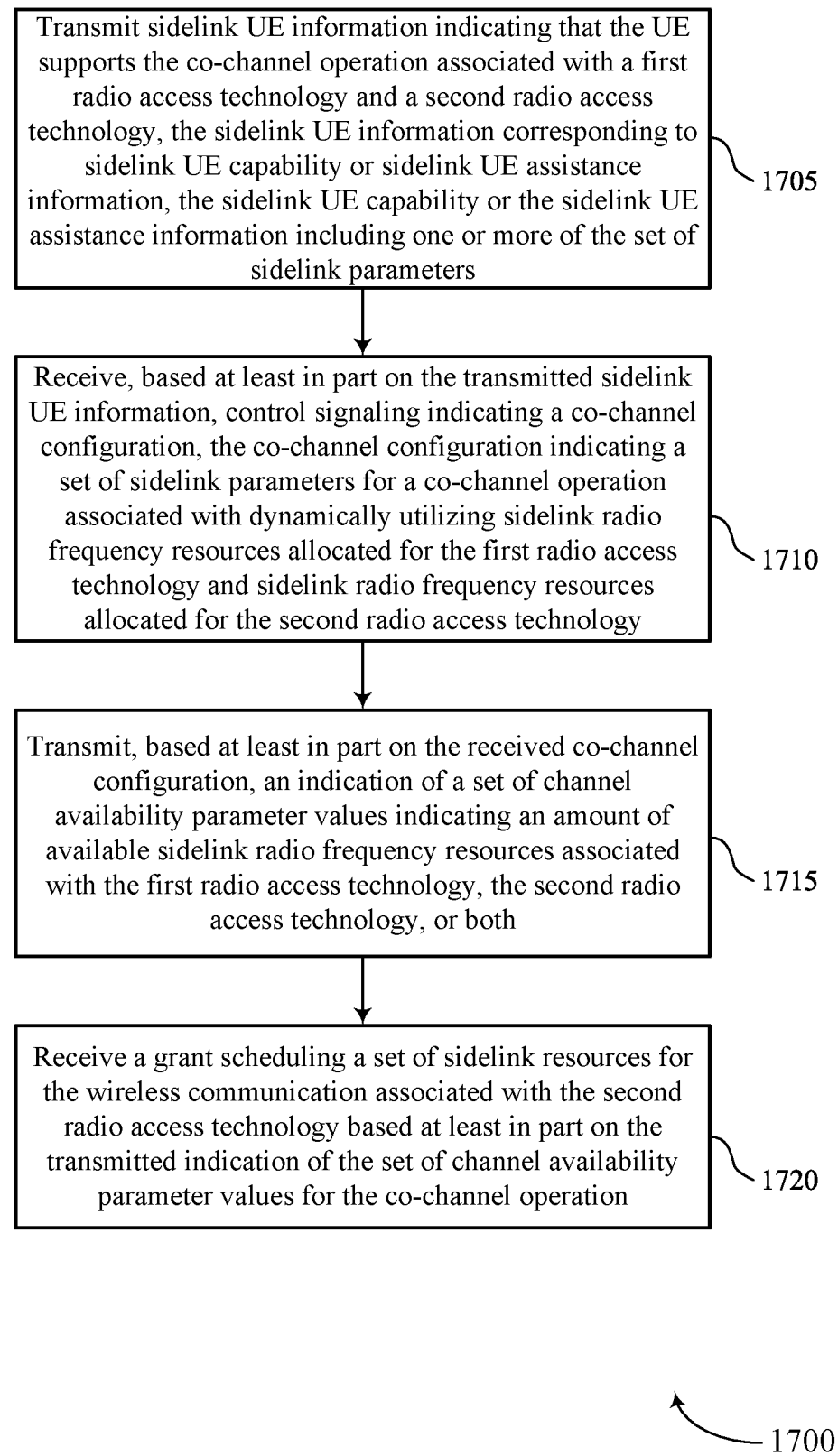

FIG. 17 shows a flowchart illustrating a method 1700 that supports managing co-channel operations for multiple radio access technologies in accordance with aspects of the present disclosure. The operations of the method 1700 may be implemented by a UE or its components as described herein. For example, the operations of the method 1700 may be performed by a UE as described with reference to FIGS. 1 through 10. In some examples, a UE may execute a set of instructions to control the functional elements of the UE to perform the described functions. Additionally or alternatively, a UE may perform aspects of the described functions using special-purpose hardware.

At 1705, the method may include transmitting sidelink UE information indicating that the UE supports the co-channel operation associated with a first radio access technology and a second radio access technology, the sidelink UE information corresponding to sidelink UE capability or sidelink UE assistance information, the sidelink UE capability or the sidelink UE assistance information including one or more of the set of sidelink parameters. The operations of 1705 may be performed in accordance with examples as disclosed herein. In some examples, aspects of the operations of 1705 may be performed by a capability component 950 as described with reference to FIG. 9.

At 1710, the method may include receiving, based on the transmitted sidelink UE information, control signaling indicating a co-channel configuration, the co-channel configuration indicating a set of sidelink parameters for a co-channel operation associated with dynamically utilizing sidelink radio frequency resources allocated for the first radio access technology and sidelink radio frequency resources allocated for the second radio access technology. The operations of 1710 may be performed in accordance with examples as disclosed herein. In some examples, aspects of the operations of 1710 may be performed by a configuration component 925 as described with reference to FIG. 9.

At 1715, the method may include transmitting, based on the received co-channel configuration, an indication of a set of channel availability parameter values indicating an amount of available sidelink radio frequency resources associated with the first radio access technology, the second radio access technology, or both. The operations of 1715 may be performed in accordance with examples as disclosed herein. In some examples, aspects of the operations of 1715 may be performed by a parameter component 930 as described with reference to FIG. 9.

At 1720, the method may include receiving a grant scheduling a set of sidelink resources for the wireless communication associated with the second radio access technology based on the transmitted indication of the set of channel availability parameter values for the co-channel operation. The operations of 1720 may be performed in accordance with examples as disclosed herein. In some examples, aspects of the operations of 1720 may be performed by a grant component 935 as described with reference to FIG. 9.

Figure 18:
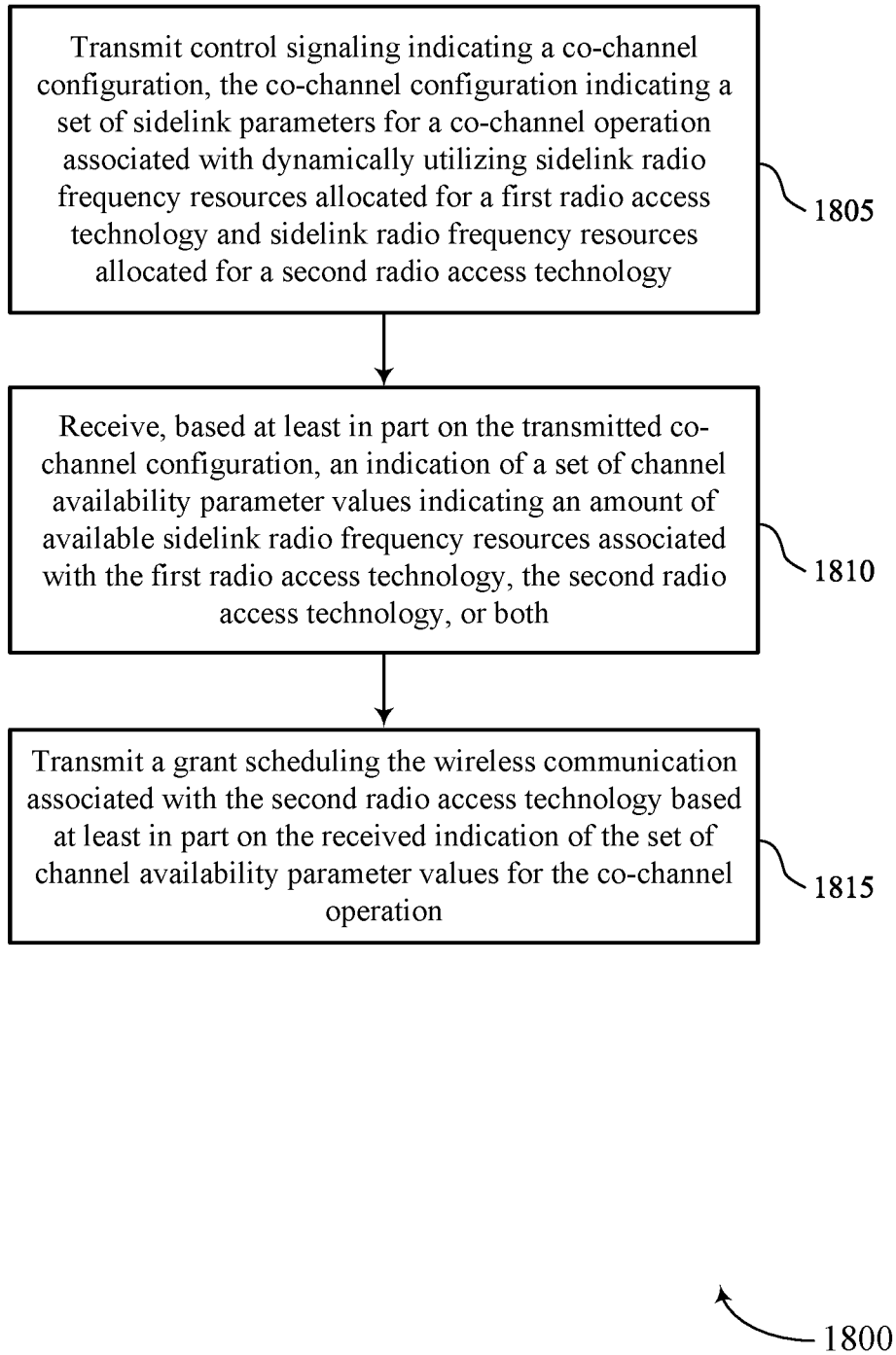

FIG. 18 shows a flowchart illustrating a method 1800 that supports managing co-channel operations for multiple radio access technologies in accordance with aspects of the present disclosure. The operations of the method 1800 may be implemented by a base station or its components as described herein. For example, the operations of the method 1800 may be performed by a base station as described with reference to FIGS. 1 through 6 and 11 through 14. In some examples, a base station may execute a set of instructions to control the functional elements of the base station to perform the described functions. Additionally or alternatively, a base station may perform aspects of the described functions using special-purpose hardware.

At 1805, the method may include transmitting control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology. The operations of 1805 may be performed in accordance with examples as disclosed herein. In some examples, aspects of the operations of 1805 may be performed by a configuration component 1325 as described with reference to FIG. 13.

At 1810, the method may include receiving, based on the transmitted co-channel configuration, an indication of a set of channel availability parameter values indicating an amount of available sidelink radio frequency resources associated with the first radio access technology, the second radio access technology, or both. The operations of 1810 may be performed in accordance with examples as disclosed herein. In some examples, aspects of the operations of 1810 may be performed by a parameter component 1330 as described with reference to FIG. 13.

At 1815, the method may include transmitting a grant scheduling the wireless communication associated with the second radio access technology based on the received indication of the set of channel availability parameter values for the co-channel operation. The operations of 1815 may be performed in accordance with examples as disclosed herein. In some examples, aspects of the operations of 1815 may be performed by a grant component 1335 as described with reference to FIG. 13.

The following provides an overview of aspects of the present disclosure:

Aspect 1: A method for wireless communication at a UE, comprising: receiving control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology; transmitting, based at least in part on the received co-channel configuration, an indication of a set of channel availability parameter values indicating an amount of available sidelink radio frequency resources associated with the first radio access technology, the second radio access technology, or both; and receiving a grant scheduling a set of sidelink resources for the wireless communication associated with the second radio access technology based at least in part on the transmitted indication of the set of channel availability parameter values for the co-channel operation.

Aspect 2: The method of aspect 1, further comprising: determining that the co-channel operation associated with the first radio access technology is enabled or disabled based at least in part on at least one sidelink parameter of the set of sidelink parameters in the received control signaling, wherein the at least one sidelink parameter comprises a bit field indicating that the co-channel operation is enabled or disabled.

Aspect 3: The method of any of aspects 1 through 2, further comprising: determining a set of component carriers supporting the co-channel operation associated with the first radio access technology and the second radio access technology based at least in part on at least one sidelink parameter of the set of sidelink parameters in the received control signaling, wherein the set of component carriers includes one or more of a first subset of component carriers associated with the first radio access technology indicated as shareable or un-shareable with the second radio access technology.

Aspect 4: The method of aspect 3, further comprising: determining a set of sidelink resource pools based at least in part on the determined set of component carriers supporting the co-channel operation associated with the first radio access technology and the second radio access technology, wherein the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

Aspect 5: The method of any of aspects 1 through 4, wherein receiving the grant comprises: receiving a DCI indicating one or more of the first subset of sidelink resource pools associated with the first radio access technology nonoverlapping with the second subset of sidelink resource pools associated with the second radio access technology, the third subset of sidelink resource pools associated with the first radio access technology overlapping with the fourth subset of sidelink resource pools associated with the second radio access technology, or the fourth subset of sidelink resource pools associated with the second radio access technology overlapping with the third subset of sidelink resource pools associated with the first radio access technology.

Aspect 6: The method of any of aspects 1 through 5, wherein receiving the control signaling comprises: receiving an RRC message including the co-channel configuration indicating the set of sidelink parameters for the co-channel operation.

Aspect 7: The method of any of aspects 1 through 6, wherein receiving the control signaling comprises: receiving SI including the co-channel configuration indicating the set of sidelink parameters for the co-channel operation, the SI comprising a sidelink SIB.

Aspect 8: The method of any of aspects 1 through 7, further comprising: determining a sidelink reporting configuration for the set of channel availability parameter values based at least in part on at least one sidelink parameter of the set of sidelink parameters in the received control signaling, the at least one sidelink parameter corresponding to one or more of sidelink measurement or sidelink reporting, wherein transmitting the indication of the set of channel availability parameter values for the co-channel operation associated with one or more of the first radio access technology or the second radio access technology is based at least in part on the determined sidelink reporting configuration.

Aspect 9: The method of any of aspects 1 through 8, further comprising: transmitting sidelink UE information indicating that the UE supports the co-channel operation associated with the first radio access technology and the second radio access technology, the sidelink UE information corresponding to sidelink UE capability or sidelink UE assistance information, the sidelink UE capability or the sidelink UE assistance information including one or more of the set of sidelink parameters, wherein receiving the control signaling indicating the co-channel configuration is based at least in part on the transmitted sidelink UE information.

Aspect 10: The method of any of aspects 1 through 9, further comprising: determining a PUSCH configured for reporting the set of channel availability parameter values for the co-channel operation, wherein transmitting the indication comprises: transmitting a MAC-CE using the PUSCH, the MAC-CE including the indication of the set of channel availability parameter values for the co-channel operation associated with the second radio access technology.

Aspect 11: The method of any of aspects 1 through 10, further comprising: determining a PUCCH configured for reporting the set of channel availability parameter values for the co-channel operation, wherein transmitting the indication comprises: transmitting UCI using the PUCCH, the UCI including the indication of the set of channel availability parameter values for the co-channel operation associated with the second radio access technology.

Aspect 12: The method of any of aspects 1 through 11, further comprising: aggregating one or more channel availability parameter values into the set of channel availability parameter values for the co-channel operation based at least in part on receiving the one or more channel availability parameter values from one or more additional UEs, wherein the indication indicates the aggregated one or more channel availability parameter values for the co-channel operation associated with the second radio access technology.

Aspect 13: The method of aspect 12, further comprising: determining a PUSCH configured for reporting the aggregated one or more channel availability parameter values for the co-channel operation associated with the second radio access technology, wherein transmitting the indication comprises: transmitting a plurality of MAC-CEs using a PUSCH, each MAC-CE of the plurality of MAC-CEs indicating a respective channel availability parameter value of the aggregated one or more channel availability parameter values.

Aspect 14: The method of any of aspects 12 through 13, further comprising: determining a PUSCH configured for reporting the aggregated one or more channel availability parameter values for the co-channel operation associated with the second radio access technology, wherein transmitting the indication comprises: transmitting a MAC-CE using a PUSCH, the MAC-CE including the indication of the aggregated one or more channel availability parameter values, the MAC-CE including a plurality of MAC-CE fields, each MAC-CE field indicating a respective channel availability parameter value of the aggregated one or more channel availability parameter values.

Aspect 15: The method of any of aspects 1 through 14, further comprising: determining a QoS for wireless communication associated with the second radio access technology, the QoS of service indicating one or more of a latency metric or a priority metric associated with the wireless communication, wherein transmitting the indication of the set of channel availability parameter values for the co-channel operation associated with the first radio access technology and the second radio access technology is based at least in part on determining the QoS for wireless communication associated with the second radio access technology.

Aspect 16: The method of any of aspects 1 through 15, further comprising: estimating at least one channel availability parameter value of the set of channel availability parameter values associated with the first radio access technology or the second radio access technology, wherein transmitting the indication of the set of channel availability parameter values for the co-channel operation associated with the first radio access technology and the second radio access technology is based at least in part on estimating the at least one channel availability parameter value of the set of channel availability parameter values associated with the first radio access technology or the second radio access technology.

Aspect 17: The method of any of aspects 1 through 16, further comprising: determining a CBR for a set of component carriers associated with one or more of the first radio access technology or the second radio access technology wherein transmitting the indication of the set of channel availability parameter values for the co-channel operation associated with the first radio access technology and the second radio access technology is based at least in part on determining the CBR for the set of component carriers associated with one or more of the first radio access technology or the second radio access technology.

Aspect 18: The method of any of aspects 1 through 17, further comprising: transmitting a scheduling request configured for the co-channel operation associated with the first radio access technology and the second radio access technology, wherein receiving the grant scheduling the wireless communication is based at least in part on transmitting the scheduling request configured for the co-channel operation.

Aspect 19: The method of any of aspects 1 through 18, wherein at least one channel availability parameter value of the set of channel availability parameter values is based at least in part on a traffic load or a number of UEs associated with one or more of the first radio access technology or the second radio access technology.

Aspect 20: The method of any of aspects 1 through 19, wherein receiving the grant comprises: receiving a dynamic grant via a DCI including a DCI field enabling the UE to report the set of channel availability parameter values for the co-channel operation associated with one or more of the first radio access technology or the second radio access technology, wherein transmitting the indication is based at least in part on the received DCI.

Aspect 21: The method of any of aspects 1 through 20, further comprising: transmitting sidelink control information indicating unavailable sidelink resources associated with the first radio access technology based at least in part on receiving a DCI including a DCI field indicating a set of resources associated with one or more of the first radio access technology or the second radio access technology.

Aspect 22: The method of any of aspects 1 through 21, wherein receiving the grant comprises: receiving a configured grant via a RRC message, the configured grant indicting that the set of sidelink resources are updated for the wireless communication associated with the second radio access technology, the set of sidelink resources corresponding to a set of resource associated with the first radio access technology.

Aspect 23: The method of any of aspects 1 through 22, wherein receiving the grant comprises: receiving a configured grant via a DCI activating the set of sidelink resources for the wireless communication associated with the second radio access technology, the set of sidelink resources corresponding to a set of resource associated with the first radio access technology.

Aspect 24: The method of any of aspects 1 through 23, wherein the first radio access technology comprises fourth generation (4G) Long-Term Evolution (LTE) and the second radio access technology comprises fifth generation (5G) new radio (NR).

Aspect 25: A method for wireless communication at a base station, comprising: transmitting control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology, receiving, based at least in part on the transmitted co-channel configuration, an indication of a set of channel availability parameter values indicating an amount of available sidelink radio frequency resources associated with the first radio access technology, the second radio access technology, or both; and transmitting a grant scheduling the wireless communication associated with the second radio access technology based at least in part on the received indication of the set of channel availability parameter values for the co-channel operation.

Aspect 26: The method of aspect 25, wherein transmitting the control signaling comprises: transmitting a RRC message including the co-channel configuration indicating the set of sidelink parameters for the co-channel operation.

Aspect 27: The method of any of aspects 25 through 26, wherein transmitting the control signaling comprises: transmitting SI including the co-channel configuration indicating the set of sidelink parameters for the co-channel operation, the SI comprising a sidelink SIB.

Aspect 28: The method of any of aspects 25 through 27, wherein transmitting the grant comprises: transmitting a DCI indicating one or more of a first subset of sidelink resource pools associated with the first radio access technology nonoverlapping with a second subset of sidelink resource pools associated with the second radio access technology, a third subset of sidelink resource pools associated with the first radio access technology overlapping with a fourth subset of sidelink resource pools associated with the second radio access technology, or the fourth subset of sidelink resource pools associated with the second radio access technology overlapping with the third subset of sidelink resource pools associated with the first radio access technology.

Aspect 29: An apparatus for wireless communication at a UE, comprising a processor; memory coupled with the processor; and instructions stored in the memory and executable by the processor to cause the apparatus to perform a method of any of aspects 1 through 24.

Aspect 30: An apparatus for wireless communication at a UE, comprising at least one means for performing a method of any of aspects 1 through 24.

Aspect 31: A non-transitory computer-readable medium storing code for wireless communication at a UE, the code comprising instructions executable by a processor to perform a method of any of aspects 1 through 24.

Aspect 32: An apparatus for wireless communication at a base station, comprising a processor; memory coupled with the processor; and instructions stored in the memory and executable by the processor to cause the apparatus to perform a method of any of aspects 25 through 28.

Aspect 33: An apparatus for wireless communication at a base station, comprising at least one means for performing a method of any of aspects 25 through 28.

Aspect 34: A non-transitory computer-readable medium storing code for wireless communication at a base station, the code comprising instructions executable by a processor to perform a method of any of aspects 25 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology;
   transmitting, based at least in part on the received co-channel configuration, an indication of a set of channel availability parameter values indicating an amount of available sidelink radio frequency resources associated with the first radio access technology, the second radio access technology, or both; and
   receiving a grant scheduling a set of sidelink resources for the wireless communication associated with the second radio access technology based at least in part on the transmitted indication of the set of channel availability parameter values for the co-channel operation.

2. The method of claim 1, further comprising:
   determining that the co-channel operation associated with the first radio access technology is enabled or disabled based at least in part on at least one sidelink parameter of the set of sidelink parameters in the received control signaling,
   wherein the at least one sidelink parameter comprises a bit field indicating that the co-channel operation is enabled or disabled.

3. The method of claim 1, further comprising:
   determining a set of component carriers supporting the co-channel operation associated with the first radio access technology and the second radio access technology based at least in part on at least one sidelink parameter of the set of sidelink parameters in the received control signaling,
   wherein the set of component carriers includes one or more of a first subset of component carriers associated with the first radio access technology indicated as shareable or un-shareable with the second radio access technology.

4. The method of claim 3, further comprising:
   determining a set of sidelink resource pools based at least in part on the determined set of component carriers supporting the co-channel operation associated with the first radio access technology and the second radio access technology,
   wherein the set of sidelink resource pools includes one or more of a first subset of sidelink resource pools associated with the first radio access technology nonoverlapping with a second subset of sidelink resource pools associated with the second radio access technology, or a third subset of sidelink resource pools associated with the first radio access technology overlapping with a fourth subset of sidelink resource pools associated with the second radio access technology.

5. The method of claim 1, wherein receiving the grant comprises:
   receiving a downlink control information indicating one or more of a first subset of sidelink resource pools associated with the first radio access technology non-overlapping with a second subset of sidelink resource pools associated with the second radio access technology, a third subset of sidelink resource pools associated with the first radio access technology overlapping with a fourth subset of sidelink resource pools associated with the second radio access technology, or the fourth subset of sidelink resource pools associated with the second radio access technology overlapping with the third subset of sidelink resource pools associated with the first radio access technology.

6. The method of claim 1, wherein receiving the control signaling comprises:
   receiving a radio resource control message including the co-channel configuration indicating the set of sidelink parameters for the co-channel operation.

7. The method of claim 1, wherein receiving the control signaling comprises:
   receiving system information including the co-channel configuration indicating the set of sidelink parameters for the co-channel operation, the system information comprising a sidelink system information block.

8. The method of claim 1, further comprising:
   determining a sidelink reporting configuration for the set of channel availability parameter values based at least in part on at least one sidelink parameter of the set of sidelink parameters in the received control signaling, the at least one sidelink parameter corresponding to one or more of sidelink measurement or sidelink reporting, wherein transmitting the indication of the set of channel availability parameter values for the co-channel operation associated with one or more of the first radio access technology or the second radio access technology is based at least in part on the determined sidelink reporting configuration.

9. The method of claim 1, further comprising:
transmitting sidelink UE information indicating that the UE supports the co-channel operation associated with the first radio access technology and the second radio access technology, the sidelink UE information corresponding to sidelink UE capability or sidelink UE assistance information, the sidelink UE capability or the sidelink UE assistance information including one or more of the set of sidelink parameters, wherein receiving the control signaling indicating the co-channel configuration is based at least in part on the transmitted sidelink UE information.

10. The method of claim 1, further comprising:
determining a physical uplink shared channel configured for reporting the set of channel availability parameter values for the co-channel operation, wherein transmitting the indication comprises:
transmitting a medium access control-control element using the physical uplink shared channel, the medium access control-control element including the indication of the set of channel availability parameter values for the co-channel operation associated with the second radio access technology.

11. The method of claim 1, further comprising:
determining a physical uplink control channel configured for reporting the set of channel availability parameter values for the co-channel operation, wherein transmitting the indication comprises:
transmitting uplink control information using the physical uplink control channel, the uplink control information including the indication of the set of channel availability parameter values for the co-channel operation associated with the second radio access technology.

12. The method of claim 1, further comprising:
aggregating one or more channel availability parameter values into the set of channel availability parameter values for the co-channel operation based at least in part on receiving the one or more channel availability parameter values from one or more additional UEs, wherein the indication indicates the aggregated one or more channel availability parameter values for the co-channel operation associated with the second radio access technology.

13. The method of claim 12, further comprising:
determining a physical uplink shared channel configured for reporting the aggregated one or more channel availability parameter values for the co-channel operation associated with the second radio access technology, wherein transmitting the indication comprises:
transmitting a plurality of medium access control-control elements using a physical uplink shared channel, each medium access control-control element of the plurality of medium access control-control elements indicating a respective channel availability parameter value of the aggregated one or more channel availability parameter values.

14. The method of claim 12, further comprising:
determining a physical uplink shared channel configured for reporting the aggregated one or more channel availability parameter values for the co-channel operation associated with the second radio access technology, wherein transmitting the indication comprises:
transmitting a medium access control-control element using a physical uplink shared channel, the medium access control-control element including the indication of the aggregated one or more channel availability parameter values, the medium access control-control element including a plurality of medium access control-control element fields, each medium access control-control element field indicating a respective channel availability parameter value of the aggregated one or more channel availability parameter values.

15. The method of claim 1, further comprising:
determining a quality of service for wireless communication associated with the second radio access technology, the quality of service indicating one or more of a latency metric or a priority metric associated with the wireless communication, wherein transmitting the indication of the set of channel availability parameter values for the co-channel operation associated with the first radio access technology and the second radio access technology is based at least in part on determining the quality of service for wireless communication associated with the second radio access technology.

16. The method of claim 1, further comprising:
estimating at least one channel availability parameter value of the set of channel availability parameter values associated with the first radio access technology or the second radio access technology, wherein transmitting the indication of the set of channel availability parameter values for the co-channel operation associated with the first radio access technology and the second radio access technology is based at least in part on estimating the at least one channel availability parameter value of the set of channel availability parameter values associated with the first radio access technology or the second radio access technology.

17. The method of claim 1, further comprising:
determining a channel busy ratio for a set of component carriers associated with one or more of the first radio access technology or the second radio access technology wherein transmitting the indication of the set of channel availability parameter values for the co-channel operation associated with the first radio access technology and the second radio access technology is based at least in part on determining the channel busy ratio for the set of component carriers associated with one or more of the first radio access technology or the second radio access technology.

18. The method of claim 1, further comprising:
transmitting a scheduling request configured for the co-channel operation associated with the first radio access technology and the second radio access technology, wherein receiving the grant scheduling the wireless communication is based at least in part on transmitting the scheduling request configured for the co-channel operation.

19. The method of claim 1, wherein at least one channel availability parameter value of the set of channel availability parameter values is based at least in part on a traffic load or a number of UEs associated with one or more of the first radio access technology or the second radio access technology.

20. The method of claim 1, wherein receiving the grant comprises:
receiving a dynamic grant via a downlink control information including a downlink control information field enabling the UE to report the set of channel availability parameter values for the co-channel operation associated with one or more of the first radio access technology or the second radio access technology,
wherein transmitting the indication is based at least in part on the received downlink control information.

21. The method of claim 1, further comprising:
transmitting sidelink control information indicating unavailable sidelink resources associated with the first radio access technology based at least in part on receiving a downlink control information including a downlink control information field indicating a set of resources associated with one or more of the first radio access technology or the second radio access technology.

22. The method of claim 1, wherein receiving the grant comprises:
receiving a configured grant via a radio resource control message, the configured grant indicating that the set of sidelink resources are updated for the wireless communication associated with the second radio access technology, the set of sidelink resources corresponding to a set of resource associated with the first radio access technology.

23. The method of claim 1, wherein receiving the grant comprises:
receiving a configured grant via a downlink control information activating the set of sidelink resources for the wireless communication associated with the second radio access technology, the set of sidelink resources corresponding to a set of resource associated with the first radio access technology.

24. The method of claim 1, wherein the first radio access technology comprises fourth generation (4G) Long-Term Evolution (LTE) and the second radio access technology comprises fifth generation (5G) new radio (NR).

25. A method for wireless communication at a network device, comprising:
transmitting control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology,
receiving, based at least in part on the transmitted co-channel configuration, an indication of a set of channel availability parameter values indicating an amount of available sidelink radio frequency resources associated with the first radio access technology, the second radio access technology, or both; and
transmitting a grant scheduling the wireless communication associated with the second radio access technology based at least in part on the received indication of the set of channel availability parameter values for the co-channel operation.

26. The method of claim 25, wherein transmitting the control signaling comprises:
transmitting a radio resource control message including the co-channel configuration indicating the set of sidelink parameters for the co-channel operation.

27. The method of claim 25, wherein transmitting the control signaling comprises:
transmitting system information including the co-channel configuration indicating the set of sidelink parameters for the co-channel operation, the system information comprising a sidelink system information block.

28. The method of claim 25, wherein transmitting the grant comprises:
transmitting a downlink control information indicating one or more of a first subset of sidelink resource pools associated with the first radio access technology non-overlapping with a second subset of sidelink resource pools associated with the second radio access technology, a third subset of sidelink resource pools associated with the first radio access technology overlapping with a fourth subset of sidelink resource pools associated with the second radio access technology, or the fourth subset of sidelink resource pools associated with the second radio access technology overlapping with the third subset of sidelink resource pools associated with the first radio access technology.

29. An apparatus for wireless communication, comprising:
a processor;
memory coupled with the processor; and
instructions stored in the memory and executable by the processor to cause the apparatus to:
receive control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology;
transmit, based at least in part on the received co-channel configuration, an indication of a set of channel availability parameter values indicating an amount of available sidelink radio frequency resources associated with the first radio access technology, the second radio access technology, or both; and
receive a grant scheduling a set of sidelink resources for the wireless communication associated with the second radio access technology based at least in part on the transmitted indication of the set of channel availability parameter values for the co-channel operation.

30. An apparatus for wireless communication, comprising:
a processor;
memory coupled with the processor; and
instructions stored in the memory and executable by the processor to cause the apparatus to:
transmit control signaling indicating a co-channel configuration, the co-channel configuration indicating a set of sidelink parameters for a co-channel operation associated with dynamically utilizing sidelink radio frequency resources allocated for a first radio access technology and sidelink radio frequency resources allocated for a second radio access technology,
receive, based at least in part on the transmitted co-channel configuration, an indication of a set of channel availability parameter values indicating an amount of available sidelink radio frequency resources associated with the first radio access technology, the second radio access technology, or both; and transmit a grant scheduling the wireless communication associated with the second radio access technology based at least in part on the received indication of the set of channel availability parameter values for the co-channel operation.

\* \* \* \* \*